United States Patent
Mazzeo et al.

(10) Patent No.: US 11,405,757 B2
(45) Date of Patent: Aug. 2, 2022

(54) INTEGRATED TELECOMMUNICATIONS HANDSET

(71) Applicant: Global Market Development, Inc., Edgewood, NY (US)

(72) Inventors: Anthony W Mazzeo, East Moriches, NY (US); Adam Hollander, Medford, NY (US); Christopher Scocco, Ronkonkoma, NY (US)

(73) Assignee: Global Market Development, Inc., Edgewood, NY (US)

( * ) Notice: Subject to any disclaimer, the term of this patent is extended or adjusted under 35 U.S.C. 154(b) by 0 days.

(21) Appl. No.: 15/404,872

(22) Filed: Jan. 12, 2017

(65) Prior Publication Data

US 2017/0127252 A1    May 4, 2017

Related U.S. Application Data

(63) Continuation of application No. 13/830,411, filed on Mar. 14, 2013, now Pat. No. 9,549,297, which is a
(Continued)

(51) Int. Cl.
*H04W 4/10* (2009.01)
*H04W 76/15* (2018.01)
(Continued)

(52) U.S. Cl.
CPC .......... *H04W 4/10* (2013.01); *H04B 1/3888* (2013.01); *H04M 1/0214* (2013.01);
(Continued)

(58) Field of Classification Search
CPC combination set(s) only.
See application file for complete search history.

(56) References Cited

U.S. PATENT DOCUMENTS 4,430,755 A * 2/1984 Nadir ............... H04W 88/02
455/166.1
5,365,590 A * 11/1994 Brame ............. H04W 12/033
713/153

(Continued)

OTHER PUBLICATIONS

Raj Shah, "Microprocessor Design Made Easy Using the MC68HC11" 2002 (Year: 2002).*

*Primary Examiner* — Zhiyu Lu
(74) *Attorney, Agent, or Firm* — Alfred M. Walker; John F. Vodopia

(57) ABSTRACT

A rugged, ergonomic integrated telecommunications handset includes an electronic controller that interoperates and controls the universal remote control (URC), which connects to multiple radios simultaneously. The controller downloads options which are implemented by the controller. The handset has an ability to vibrate in a silent mode, and has a memory capacity, as well as GPS capacity. Ergonomically, the handset has a pair of side arrays of protruding ribs, which enhance gripping, preventing the handset from falling out of the user's hands, even if the user has gloves on in inclement weather conditions in the field. While compatible with the latest radio system software defined dual net and dual channel radio equipment, the handset is also backward compatible with single radios or with two or more separate radios.

4 Claims, 24 Drawing Sheets

Related U.S. Application Data continuation-in-part of application No. 12/592,450, filed on Nov. 25, 2009, now abandoned.

(60) Provisional application No. 61/200,422, filed on Nov. 26, 2008.

(51) Int. Cl.

| | | |
|---|---|---|
| *H04M 1/02* | (2006.01) | |
| *H04B 1/3888* | (2015.01) | |
| *H04M 1/03* | (2006.01) | |
| *H04B 1/3827* | (2015.01) | |
| *H04B 1/38* | (2015.01) | |
| *H04L 67/00* | (2022.01) | |

(52) U.S. Cl.
CPC ........ *H04W 76/15* (2018.02); *G08C 2201/92* (2013.01); *H04B 2001/3866* (2013.01); *H04B 2001/3894* (2013.01); *H04L 67/34* (2013.01); *H04M 1/03* (2013.01); *H04M 2250/10* (2013.01)

(56) References Cited

U.S. PATENT DOCUMENTS

| | | | | |
|---|---|---|---|---|
| 5,457,748 | A * | 10/1995 | Bergum | G06F 21/86 380/270 |
| 6,013,007 | A * | 1/2000 | Root | A63B 24/0006 482/8 |
| D487,026 | S * | 2/2004 | Fleetwood | D10/104.1 |
| 2002/0146987 | A1* | 10/2002 | Maden | H04B 1/385 455/553.1 |
| 2002/0163504 | A1* | 11/2002 | Pallakoff | G06F 3/0235 345/169 |
| 2003/0207694 | A1* | 11/2003 | Legare | H04M 1/72513 455/511 |
| 2004/0125964 | A1* | 7/2004 | Graham | H04R 5/02 381/74 |
| 2004/0263479 | A1* | 12/2004 | Shkolnikov | H04M 1/0202 345/169 |
| 2007/0142072 | A1* | 6/2007 | Lassally | H04B 1/44 455/518 |
| 2008/0032624 | A1* | 2/2008 | Abraham | H04W 84/08 455/11.1 |
| 2008/0159577 | A1* | 7/2008 | Smith | H04M 1/05 381/361 |
| 2009/0052339 | A1* | 2/2009 | Spring | H04L 65/607 370/252 |
| 2009/0191822 | A1* | 7/2009 | Chen | H04W 88/06 455/90.2 |
| 2009/0291646 | A1* | 11/2009 | Ong | H04W 72/02 455/90.2 |
| 2014/0233447 | A1* | 8/2014 | Ofir | H04W 76/45 370/312 |
| 2015/0296351 | A1* | 10/2015 | Tham | H04B 1/46 455/518 |

* cited by examiner

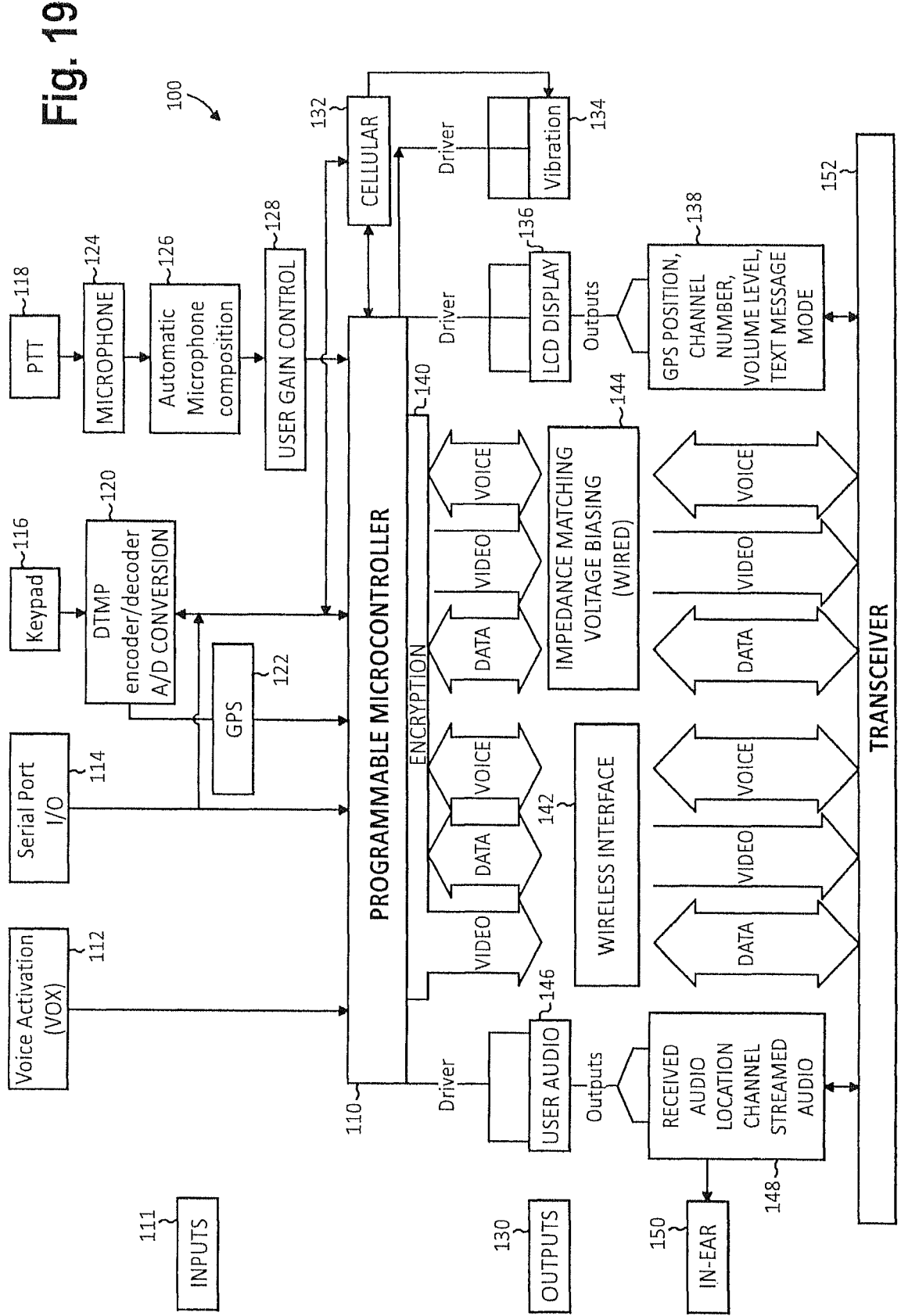

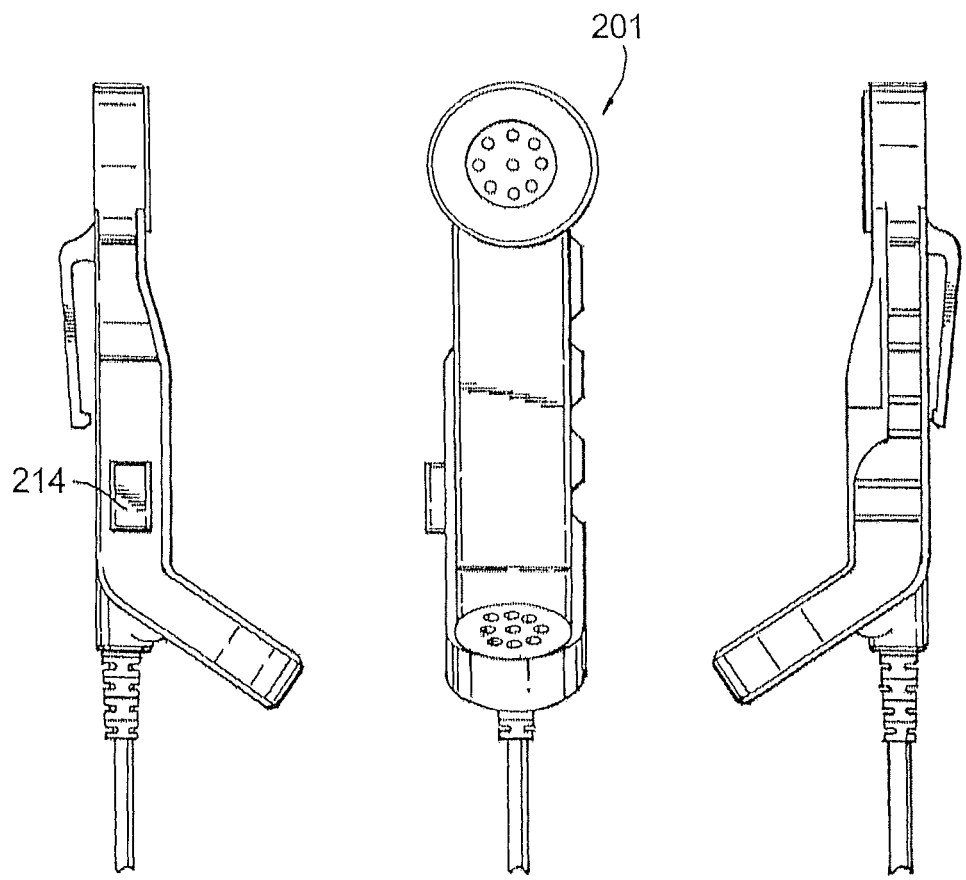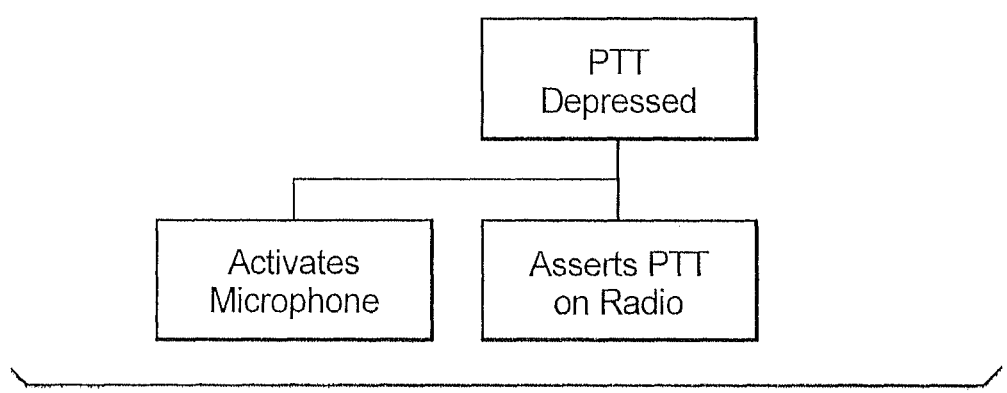
*Fig. 22A*

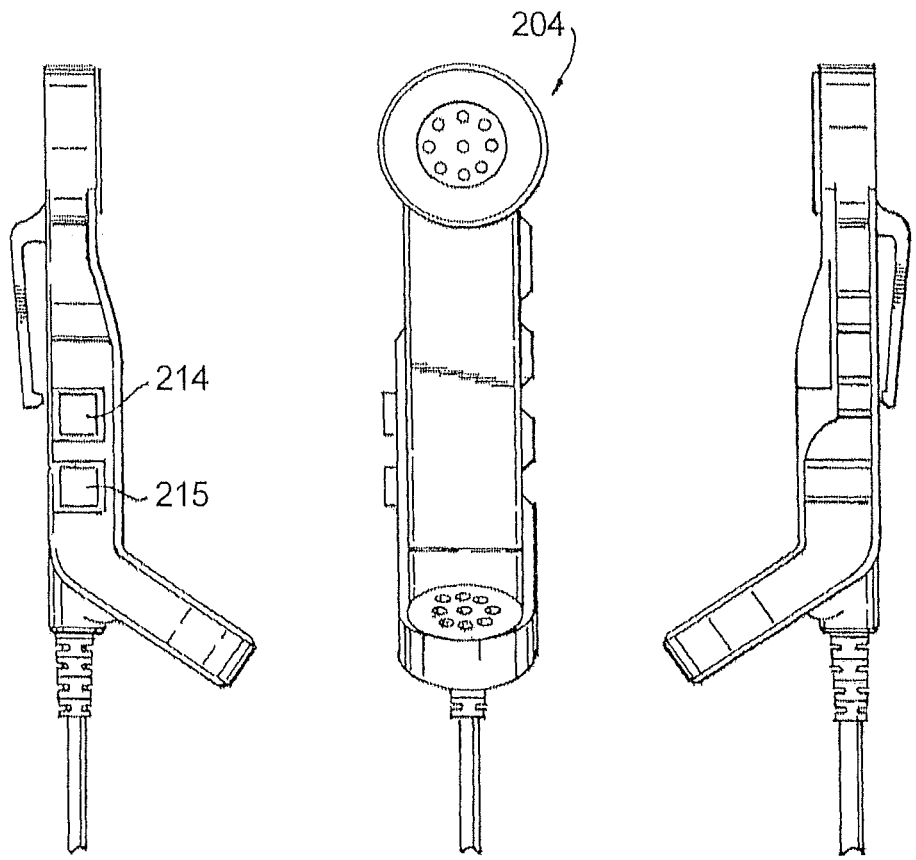
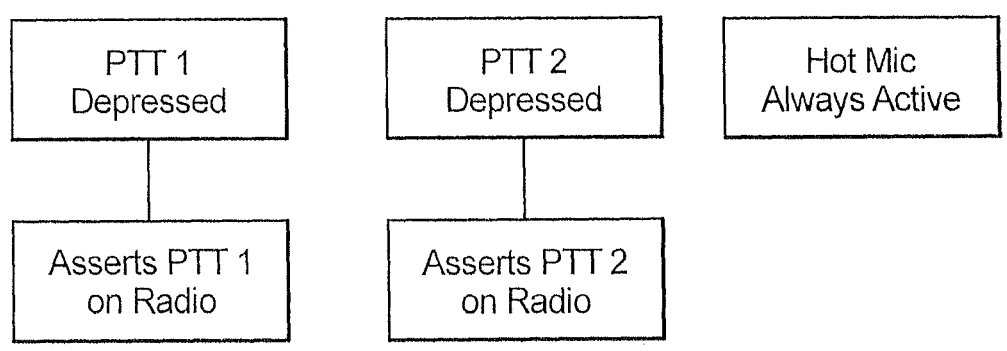
*Fig. 25A*

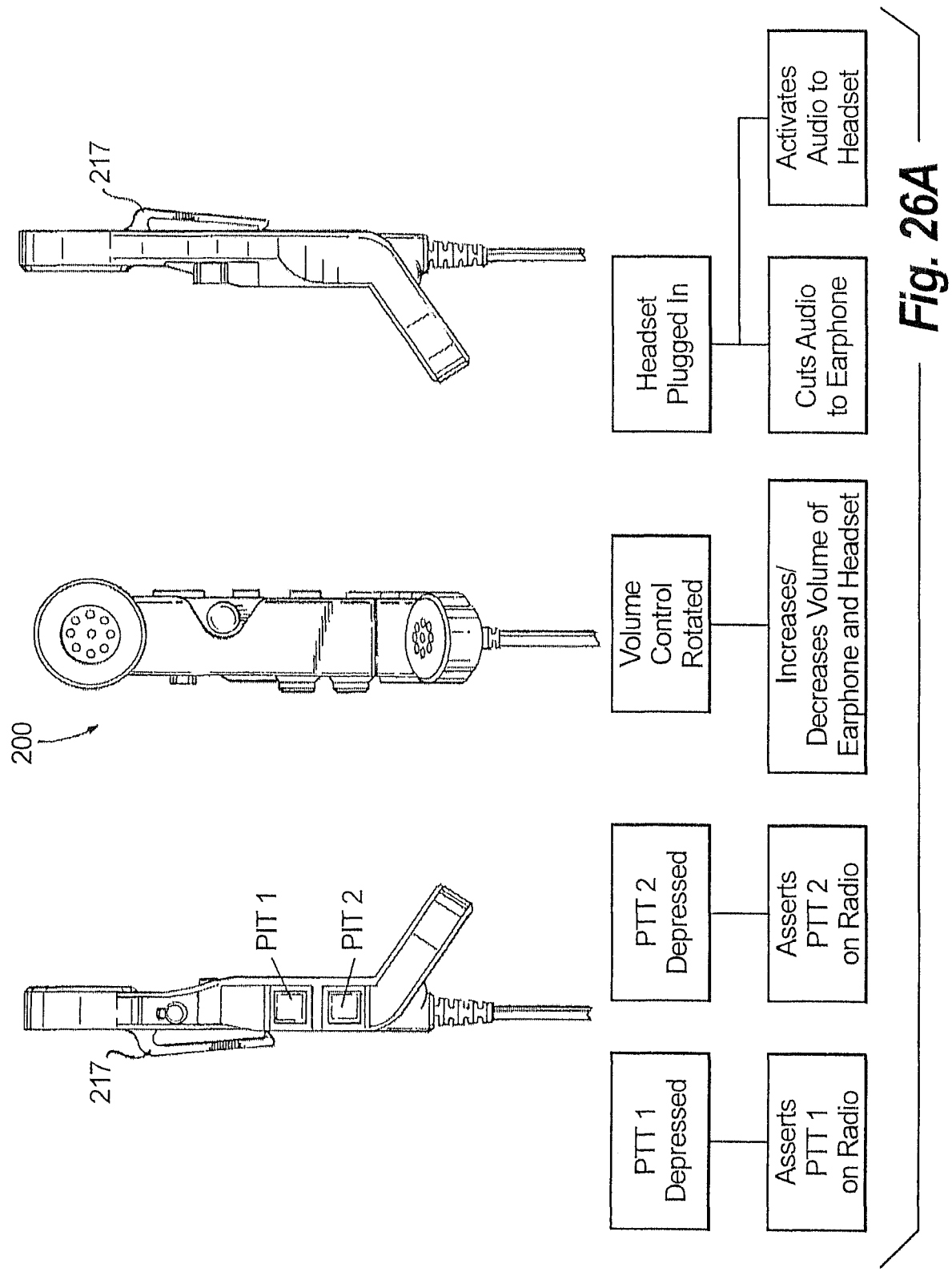

INTEGRATED TELECOMMUNICATIONS HANDSET

RELATED APPLICATIONS

This application is a continuation of, and claims priority under 35 U.S.C. § 120 from, application Ser. No. 13/380,411, filed Mar. 14, 2013. The '411 application is a continuation-in-part of application Ser. No. 12/592,450 filed Nov. 25, 2009, which application is based upon provisional patent application Ser. No. 61/200,422, filed Nov. 26, 2008, from which provisional application Applicants claimed priority benefit of 35 U.S.C. § 119(e). The aforesaid applications are incorporated by reference herein.

FIELD OF THE INVENTION

The present invention relates to a rugged, ergonomically-designed integrated telecommunications handset for wireless and wireline applications with single or multiple radio or multiple channel radios or dual net/channel radio.

BACKGROUND OF THE INVENTION

A "'two-way radio'" is a radio that can both transmit and receive, e.g., a transceiver, unlike a broadcasting receiver which only receives content. Two-way radios are available in mobile radio, stationary or base station radio and hand-held portable configurations. Hand-held radios are often called walkie-talkies, and include "push-to-talk" or "press-to-transmit" buttons to activate the transmitter. These half-duplex communications devices generally are not configured to support simultaneous two-way communications. One or more mechanisms typically are implemented in half-duplex communications devices to help ensure that is in a transmit mode only at the appropriate times. A push-to-talk (PTT) button places the communications device in a transmit mode while pressed or engaged and returns the communications device to a receive mode when the PTT button is released or disengaged. A voice operated (VOX) feature provides that a user's voice or other sound triggers the communications device to enter a transmit mode.

The first truly mobile two-way radio was developed in Australia in 1923. In 1933, the Bayonne, N.J. police department successfully operated a two-way system between a central fixed station and radio transceivers installed in police cars. This allowed for rapidly directing police response in emergencies. During World War II, walkie talkies, or hand held transceivers were used extensively by air and ground troops.

Conventional radios operate on fixed RF channels. In the case of radios with multiple channels, they operate on one channel at a time. The proper channel is selected by a user. The user operates a channel selector or buttons on the radio control panel to pick the channel. In multi-channel systems, channels are used for separate purposes. A channel may be reserved for a specific function or for a geographic area. Motorola uses the term "mode" to refer to channels on some conventional two-way radio models. In this use, a mode consists of a radio frequency channel and all channel-dependent options such as selective calling.

The use of two-way radios significantly improved communications and therefore effectiveness of military actions during and after WWII. The SCR 300 is the two-way radio or walkie talkie used by US forces towards the end of war. The SCR 300 comprised a backpack unit and a handset connected to the backpack, and weighed 30-40 pounds. Motorola (Galvin Manufacturing) developed the first hand-held two-way radios shortly thereafter (SCR 536), were became available at the platoon and squad level.

Various handsets have developed for use with two-way radios for military applications, for example, H-207/VCR, H-189/GR, H-250. The H-189 handset is a rugged repairable handset unit molded out of polycarbonate lexan that utilizes a 1000 Ohm earphone element, a 150 Ohm dynamic noise cancelling microphone, a PTT switch and 6 foot retractile cord terminating in a 5-pin audio connector. The handset is configured to be interchangeable with H-250 Handset, and is intended for use with military man-pack radio equipment such as AN/PRC-70 and AN/PRC-77.

While such known radio handsets are quite effective for intended military applications, they are not without shortcomings. Such conventional radio handsets are physically cumbersome, and are constructed with limited operational electronics capabilities.

SUMMARY OF THE INVENTION

It is an object of this invention to provide a rugged, ergonomic integrated telecommunications handset, which overcomes the shortcomings of the conventional arts.

It is an object of the present invention to provide an integrated telecommunications handset, which is a direct replacement for most tactical handsets in use today.

In keeping with these objects and others which may become apparent, the present invention is an integrated telecommunications handset which includes ruggedized ergonomic features making it versatile to use. For example, opposite fringed arrays of rounded protruding nibs on each side of the handset housing render the handset readily graspable and therefore easy to use with or without gloves, which are likely to be worn by the user in inclement weather, particularly in colder climates. That is, the arrays of nibs on each side of render it less likely that the handset device will slip out of the user's hand. A keyboard is provided for data command input is readily accessible (as shown in the drawing figures) accessible and an embodiment configured with a flat top permits the handset to stand inverted on a table for ready access, while not in use.

In an embodiment, the integrated telecommunications handset is foldable about a hinge, comprising a first foldable portion having an earpiece at the distal top. An electronic visual display provides for displaying images to a user. The visual display is positioned on a working face of the handset housing an earpiece and the aforementioned keyboard located adjacent the hinge. A second foldable portion, which is shorter than the first foldable portion, includes a mouthpiece with a microphone at a lower distal area of the working face or handset surface. An embodiment includes cell phone capability with sound-producing amplifiers. The visual display displays the user's GPS position in view of GPS ability. The visual display displays channel number, appropriate telephone number, volume level, alphanumeric text messages, and identifies whether the phone is in normal audio producing mode or vibrate mode, or both. The earpiece produces sounds including received audio, locations, channel and streamed audio. To allow its use as a receiver, the mouthpiece lower portion folds over the lower area of the upper portion, while leaving the earpiece exposed. The hingedly attached upper and lower portions fold between an outward deployed position and an inward storage position. The hinged portion includes hinged attachments.

The rugged, ergonomic integrated telecommunications handset includes an electronic controller that interoperates and controls the universal remote control (URC). URC allows for the handset to wirelessly connect to multiple radios simultaneously. The controller downloads options which are implemented by the controller. The handset has an ability to vibrate in a silent mode, and has a memory capacity.

In a preferred embodiment, the foldable handset is compact in size, approximately four inches in height in the closed position, e.g., a maximum of 4.75 inches in height, 1.875 inches in width, 1.125 inches in depth, up to 1.375 inches in depth with a pocket or belt clip attached thereto. The handset is lightweight, weighing approximately 10 oz without a cable attached. The handset comprises a speaker microphone with electret capability, and a convenient auxiliary input/output port at a top end, above the earpiece. Made of rugged materials, it is preferably buoyant and watertight to a depth of one meter if it falls is water for up to 31 minutes. The handset controls include waterproof pushbuttons for on/off, volume adjustment, GPS positioning and other functions. The electronic components inside the handset are shock mounted inside of the handset and are preferably coated for moisture resistance. The preferred handset material is rigid plastic, e.g., acrylonitrile-butadiene styrene (ABS) or Polycarbonate (PC), which is impact resistant in hot and cold environments, with an optional outer covering of a resilient tough elastomer, especially where gripped by the hand of the user. The handset is resistant to rain, dust, vibrations and shock. In an embodiment, a recessed and guarded on-off/volume switch for an external speaker microphone is provided. When opened from the closed position, the mouthpiece/microphone portion is presented at an angle of appropriately 15 to 25 degrees off of a horizontal position, preferably 20 degrees off of a horizontal portion.

In an embodiment, the invention includes a foldable telecommunications handset. The handset comprises a first elongate body having a proximal end region including a proximal end, a distal end region including a distal end, top and bottom portions that define a height, and side portions that define a width. The proximal end region includes a hinged edge portion joinable to a second elongate body having a proximal end region including a proximal end at the hinged edge portion, a distal end region including a distal end, top and bottom portions that define a height, and side portions that define a width.

The handset is foldable about the hinged edge portion to a closed position wherein in the closed position the height of the first elongate body exceeds the height of the second elongate body, leaving an exposed portion in a region of the first elongate body above the distal end of the second elongate body. The first elongate body has an exposed earpiece in the exposed portion in the region of the first elongate body above the distal end of the second elongate body. The handset is openable about the hinged edge to expose a mouthpiece on an inner portion of the second elongate body and a keyboard and visual display on an inner portion of the first elongate body in a region thereof below the exposed portion of the first elongate body having the exposed earpiece in the closed position.

The first elongate portion has a first array of parallel transverse ribs extending perpendicular to a longitudinal axis of the handset along respective left and right side portions of the first elongate body below the exposed portion having the earpiece. The second elongate portion has a second array of parallel transverse ribs extending perpendicular to a longitudinal axis of the handset along respective left and right side portions of the second elongate body. In the closed position of the handset, the respective left and right portions of the first elongate body below the earpiece and the respective left and right portions of the second elongate body are co-linear with each other, and the first array of parallel transverse ribs and the second array of parallel transverse ribs are in positional register with each other. The first and second arrays of parallel grasping ribs provide a tactile grasping surface for the user in the open and the closed positions of the handset.

The handset is preferably is constructed from a polymeric material. Alternatively, at last a portion of the handset is constructed from an elastomeric polymeric material. The handset can include an integrated electronics system for controlling time-critical function. An earpiece included on the front surface of the proximal end region is electronically coupled to the integrated electronics system. A mouthpiece included on the front surface of the distal end region is electronically coupled to the integrated electronics system. A keypad included on the front surface of the middle region is electronically coupled to the integrated electronics system. A visual display included on the front surface of the middle region is electronically coupled to the integrated electronics system. A transceiver for data exchange is electronically coupled to the integrated electronics system.

A wireless interface built into the elongate body facilitates wireless data exchange with the transceiver and is electronically coupled to the integrated electronics system. An interface port built in to the elongate body and accessible from one region surface facilitate wired data exchange and is electronically coupled to the integrated electronics system. At least one push-to-talk switch disposed on the side portion surfaces of the planar middle region is electronically coupled to the integrated electronics system. A GPS module electronically is coupled to the integrated electronics system. A VOX On/Off switch is electronically coupled to the integrated electronics system and a VoIP module is electronically coupled to the integrated electronics system.

Preferably, the integrated electronics system comprises one of an embedded control system and a memory-programmable control system in order to control the integrated electronics system controls GPS processing in a time critical manner. The interface port may be serial. A depressible-beacon-activate switch is disposed on a surface directly opposite a surface upon which the push-to-talk (PTT) switch is located. Upon depression, the depressible-beacon-activate switch activates a beacon locator function that causes a locator beacon to be transmitted. The integrated electronics system controls the beacon locator function in a time critical manner. The integrated electronics system comprises one of an embedded control system and a memory-programmable control system.

In another embodiment, the invention includes a telecommunications handset comprising a elongate body having a substantially planar proximal end region extending between a proximal end and a distal end along a longitudinal central axis, a substantially planar distal end region extending between a proximal end and a distal end along a longitudinal central axis and a substantially planar middle region extending between a proximal end and a distal end along a longitudinal central axis. The middle region is integral with and positioned between the distal end of the proximate end region and the proximal end of the distal end region. The regions each include side portions including surfaces that define a region depth and each include front and back portions including surfaces that define a region width.

An integrated electronics system for controlling time-critical function. An earpiece included on the front surface of the proximal end region is electronically coupled to the integrated electronics system. A mouthpiece included on the front surface of the distal end region is electronically coupled to the integrated electronics system. A keypad included on the front surface of the middle region is electronically coupled to the integrated electronics system. A visual display included on the front surface of the middle region is electronically coupled to the integrated electronics system. A transceiver for data exchange is electronically coupled to the integrated electronics system. A wireless interface built into the elongate body to facilitate wireless data exchange with the transceiver is electronically coupled to the integrated electronics system.

An interface port built in to the elongate body is accessible from one region surface to facilitate wired data exchange that is electronically coupled to the integrated electronics system. At least one push-to-talk (PTT) switch disposed on the side portion surfaces of the planar middle region and electronically coupled to the integrated electronics system. A GPS module is electronically coupled to the integrated electronics system. A VOX On/Off switch electronically coupled to the integrated electronics system. A VoIP module electronically coupled to the integrated electronics system. The substantially planar proximal end region and the substantially planar middle region are aligned along the respective longitudinal central axes.

The surfaces of the side portions of the planar middle region comprise respective parallel arrays of transverse ribs extending perpendicular to the aligned longitudinal central axes of the planar proximal end region and planar middle region to provide a tactile grasping feature for ready grasping of the handset by a user. The proximal end of the planar distal end region is integral with the distal end of the planar middle region and arranged so that the central axis of the planar distal end region is arranged at an acute angle to the aligned longitudinal central axes of the planar proximal end region and planar middle region and to facilitate fixation to a user helmet.

In another embodiment, the invention provides a ruggedized integrated telecommunication handset with ergonomic features comprises an upper portion and a lower portion. The upper portion has an earpiece located adjacent a free end thereof, a visual display and a keyboard. The lower portion has on the front face thereof a mouthpiece containing a microphone and a dynamic or balanced armature speakerphone. The upper and lower portions have side walls with rounded protruding nibs allowing for convenient use by a user wearing gloves. The handset contains an embedded, programmable microcontroller operated in accordance with a set of computer readable instructions directly connected to and implementing each of the earpiece, visual display, keyboard, microphone, speakerphone, and other operative elements of the handset.

The handset preferably includes a data transfer port and/or a transceiver and dual push-to-talk (PTT) switches. Preferably, the push-to-talk (PTT) switches are voice actuated. A transceiver, a push-to-talk (PTT) switch and a personal locator beacon switch are located on opposite sides of the handset. The handset also preferably comprises a GPS locator. The push-to-talk switch may be voice actuated. The handset preferably includes a wireline interface allowing wireless or wireline operation of the handset.

The handset may be a one piece integral handset or a foldable handset. When foldable, the handset includes an upper portion and a lower portion connected together by a hinge to allow the lower portion to be folded against the upper portion with a front face of the lower portion being flush against a front face of the upper portion. The lower portion is folded against the upper portion; the keyboard and the visual display are covered, leaving the earpiece uncovered. When integral, the one piece handset is an integral handset formed of a single piece, with an earpiece at one upper portion thereof and a mouthpiece at a lower portion thereof.

In another embodiment, the handset is a radio handset with a number of features which by selection for inclusion or exclusion creates the basis for five distinct handsets, where each of the headsets are designed to serve the different requirements. The general design of the housing with key dimensions, placement of feature controls, and functional attachments offers superior ergonomics for the warfighter, in all of the handset variations. While compatible with the latest Joint Tactical Radio Systems software defined dual net equipment (such as the Harris Falcon Radio AN/PRC-155), the inventive Radio handset also is backward compatible with single radios (H-250 replacement), with two separate radios (each H-250 replacements), with a field phone (H-350 replacement), and with a Dual Net radio.

This is advantageous in view of the fact that the handsets of the present invention frequently are used with different radios that handle their multiple channels in different ways. Some of the radios used with the inventive handsets sum all the channels together before sending them to ancillaries, while others send a separate audio signal for each channel. Also, depending on the manufacturer and radio, multiple channels have different designations such as "channel", "net", "talk group", etc. The inventive handsets are available in several configurations: multi-channel, multi-radio and dual net/channel radio. The multi-channel handset ancillaries are designed to be used with multi-channel radios, but the exact wiring is dependent upon the configuration of the radio. The multi-radio handset ancillaries of the present invention are designed to be used with more than one radio, with each radio having a standard wiring configuration.

The handsets used in the multi-channel mode are used in different ways. The handset can be connected to the radios directly, or to the loudspeaker, but never to a fill headset or a microphone set (although a user can connect a listen-only headset to the handset). The Push to Talk (PTT) controller is meant to be used in-line with headsets and other products that do not inherently operate multiple channels, thus enhancing their capability. The microphone set is used in much of the same way as the handset, except that it cannot receive audio.

By the term "standard radio" the handset is meant to include a Ground, an Audio, one PTT button and a microphone.

By the term "dual net radio" the handset is meant to include a Ground, an Audio, a first PTT button, a microphone and a second PTT button. A dual Net radio is a single radio that is capable of operating two channels, or "nets", at the same time.

These two PTT buttons operate two independent nets via hard wiring.

In an embodiment with a "dual radio" loudspeaker, the loudspeaker is capable of receiving and transmitting audio signals from two independent radios. The conventional scrambling is done by the radio.

In the two-radio embodiment, there is a wired Y connection. The other embodiments are for the dual NET radios which are already set up with a mating connector for the radio handsets. The handset without a wired Y connection is used with a dual Net radio.

In another embodiment, the handset is used with a field phone. A field phone is a hard-wired phone system usually found in larger vehicles such as tanks and APCs. They usually require a "hot mic", or a dedicated pair of connector pins that are always hooked up to the microphone, regardless of PTT status.

Functionally, a conventional thumb wheel is provided on the handsets, in a novel visual and ergonomic design, as it is positioned so that one can operate it from the front of the handset or from the side (when the handset is held against one's face). In most variations of the handset, this thumbwheel will increase or decrease the volume of audio heard through the earphone or listen-only headset. In the Dual Radio variation of the handset (Y-branch), this thumbwheel acts as a volume balance control between the two radios.

BRIEF DESCRIPTION OF THE DRAWINGS
(continued)

The present invention can best be understood in connection with the accompanying drawings. It is noted that the invention is not limited to the precise embodiments shown in drawings, in which:

FIG. 19 is a block diagram depicting one embodiment of an electronic system included in the integrated telecommunications handset;

FIG. 22A is a front and two side elevations of the radio handset of FIG. 22 with functional flow chart;

FIG. 25A is a front and two side elevations of the field phone handset of FIG. 25 with functional flow chart;

FIG. 26A is a front and two side elevations of the radio handset of FIG. 26 with functional flow chart.

DETAILED DESCRIPTION OF THE INVENTION

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

For illustrative purposes only, a preferred mode for carrying out the invention is described herein, wherein an integrated telecommunications handset includes ruggedized ergonomic features making it versatile to use and integrates and utilizes multiple field compatible electronics-based functions, including coordination of multiple radio channels and various other features.

Figure 18A:
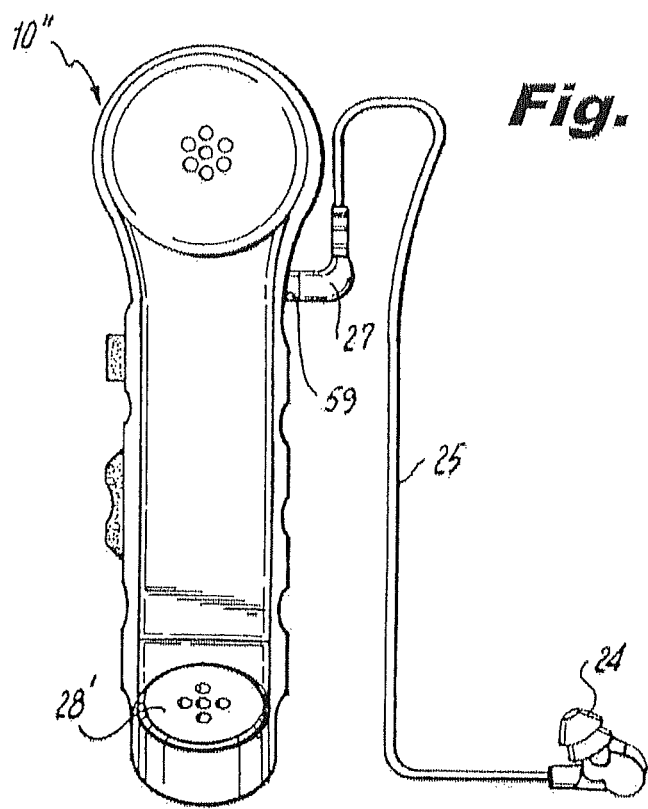
FIGS. 18A, 18B and 18C are front, side and front perspective views of an embodiment of the integrated telecommunications handset configured a one rigid piece for ready and secure mounting upon head gear, e.g., a helmet, worn by a handset user.
Figure 18B:
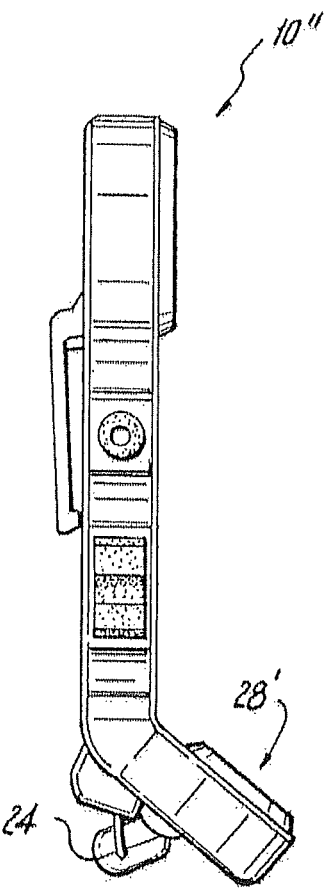
Figure 18C:
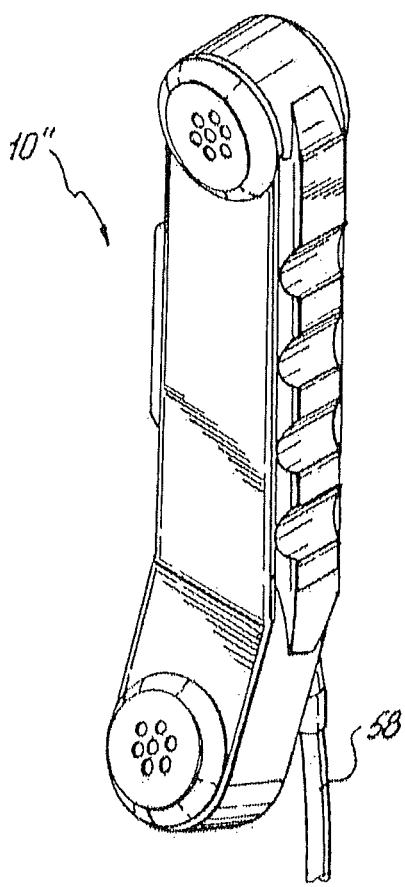

FIGS. 1-12 present various views of foldable embodiment of an integrated telecommunications handset (10) of the invention that is foldable, FIGS. 18A-C present views of a rigid embodiment of the handset (10''') and FIGS. 20-26A present views of the embodiments for dual channel and dual net radio handsets and capabilities.

As can be seen in FIGS. 1-12, the integrated telecommunications handset (10) of the present invention includes ruggedized ergonomic features making it versatile to use. For example, opposite fringed arrays (12) of rounded protruding nibs (14) make it easy to use the handset (10) with gloves on in inclement weather, i.e., with improved gripability. Additionally, the arrays (12) of nibs (14) on each on each side of the handset housing render it less likely that the handset will slip out of the user's hand. A keyboard (16) is provided for input from a user and is accessible and a flat top (18) permits the handset to stand inverted on a table.

The integrated telecommunications handset is foldable about a hinge (20) and includes a first foldable portion (22) having an earpiece (24) at the distal top. An electronic visual display (26) is included for displaying images to a user. The electronic visual display is located between the earpiece and the dialing keyboard (16), which dialing keyboard located adjacent to the hinge (20). While the keyboard is included for dialing, it is not limited to dialing, but may be used to input any information content in various modes of operation, to be described in greater detail below. A second foldable portion (28) is shorter that the first foldable portion (22), and includes a mouthpiece (30) with a microphone (32) at a lower distal area thereof The handset (10) includes sound-producing amplifiers (not shown in FIGS. 1-12 or 18A-C). These sound producing amplifiers allow the handset's use as a receiver. The mouthpiece (30) and entire second foldable portion (28) folds over a lower area of the upper portion (22), as readily seen inn the view of FIG. 7, while leaving the earpiece (24) exposed. A clip (21) is included for clipping the handset (10) to a user's clothing, or other material or device for ready access.

Figure 1:
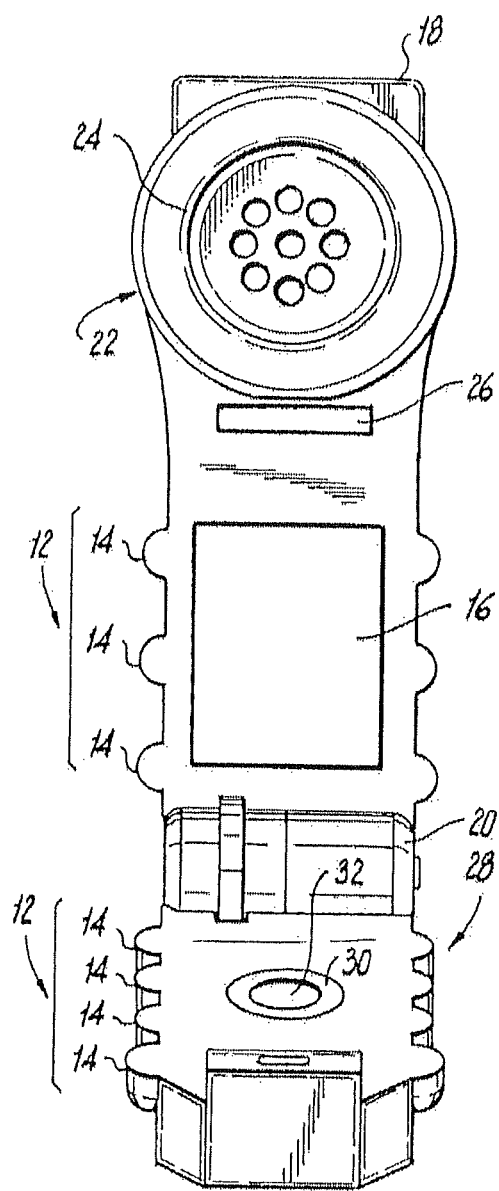
FIG. 1 is a front elevational view of the integrated telecommunications handset, shown in an open position.
Figure 2:
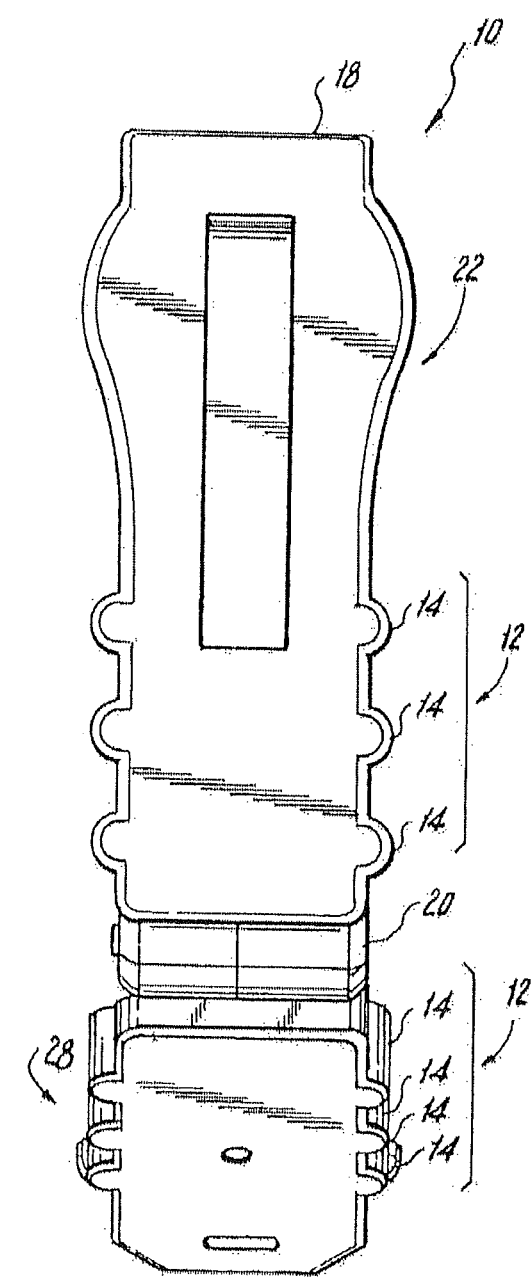
FIG. 2 is a rear elevational view of the integrated telecommunications handset.
Figure 3:
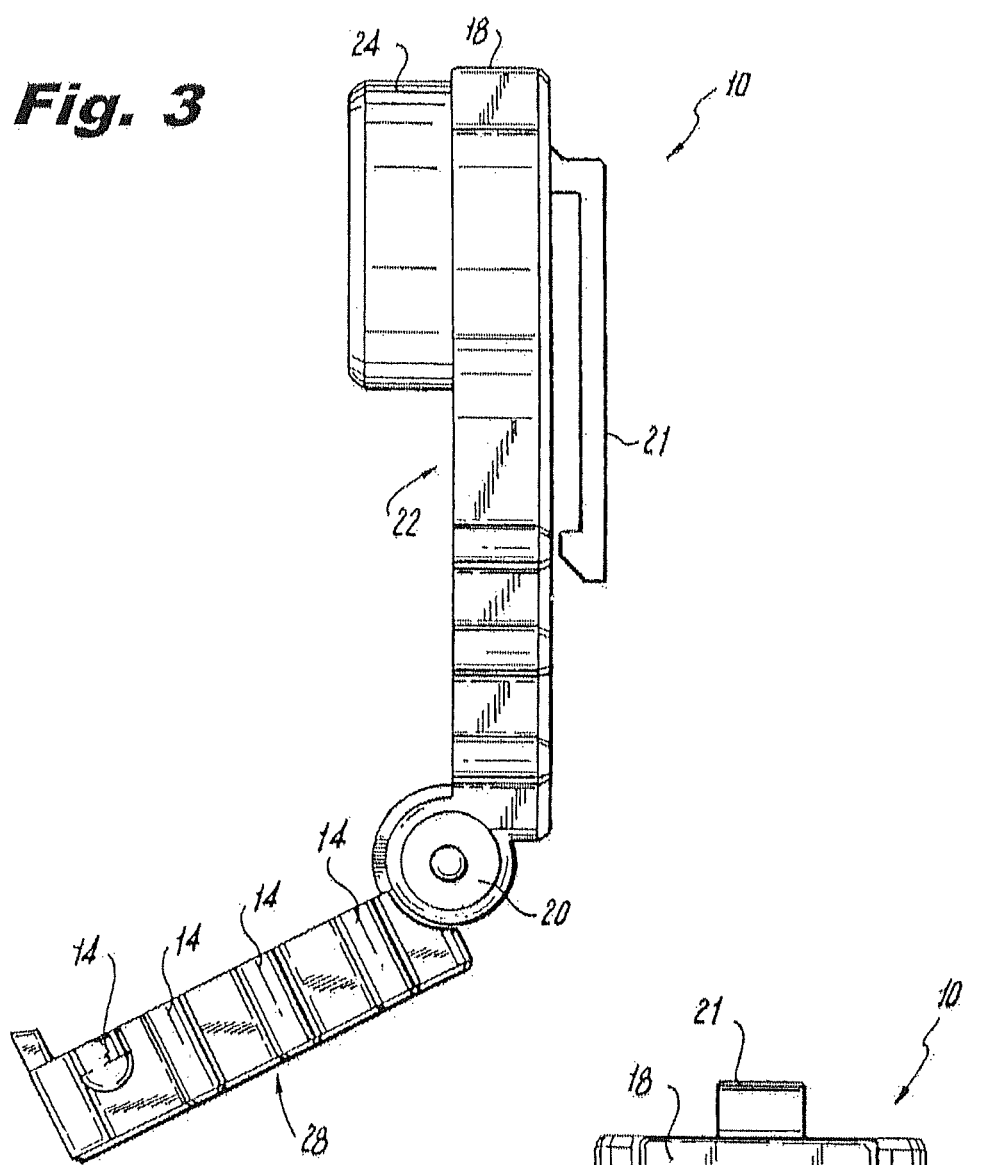
FIG. 3 is a left side elevational view of the integrated telecommunications handset.
Figure 4:
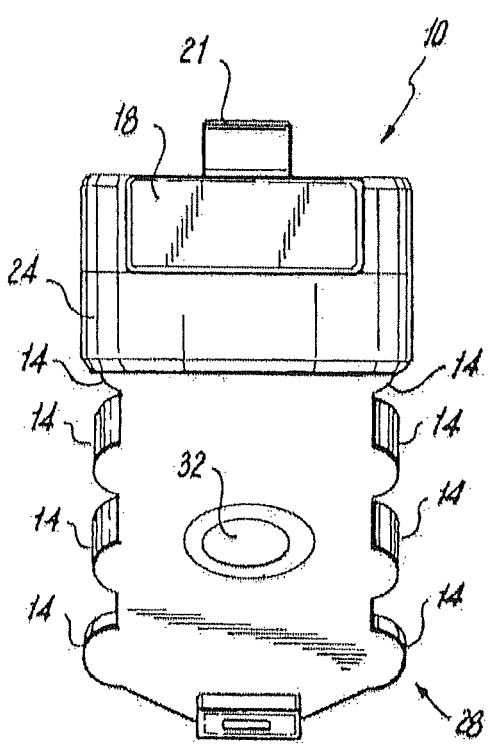
FIG. 4 is a top plan view of the integrated telecommunications handset.
Figure 5:
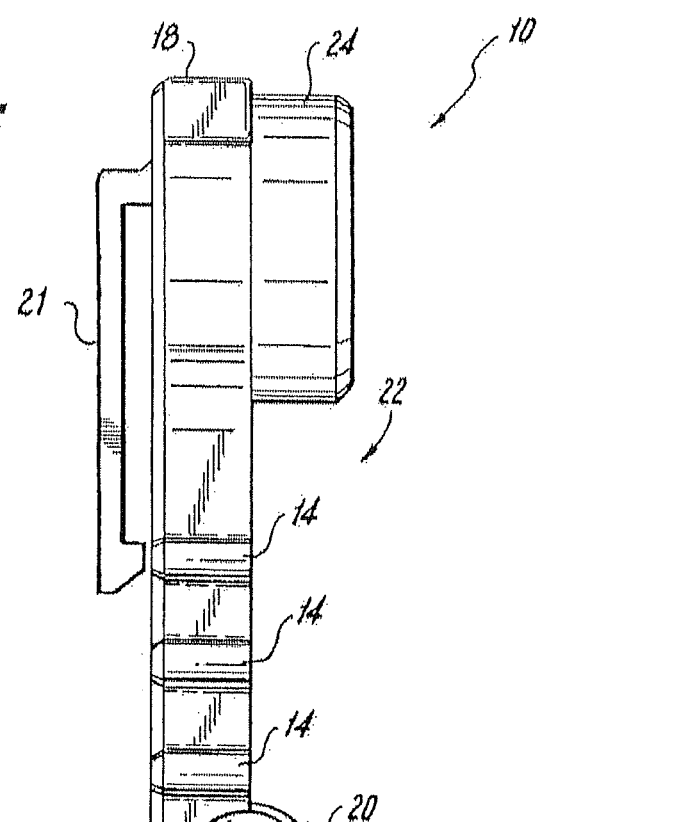
FIG. 5 is a right side elevational view of the integrated telecommunications handset.
Figure 6:
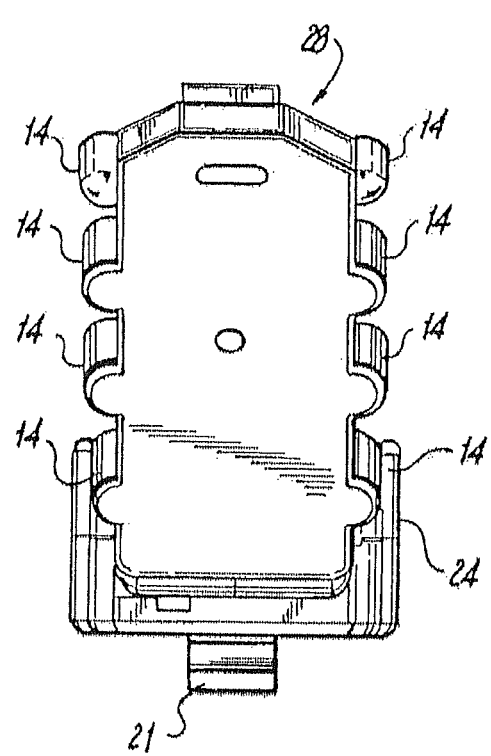
FIG. 6 is a bottom view of the integrated telecommunications handset.
Figure 7:
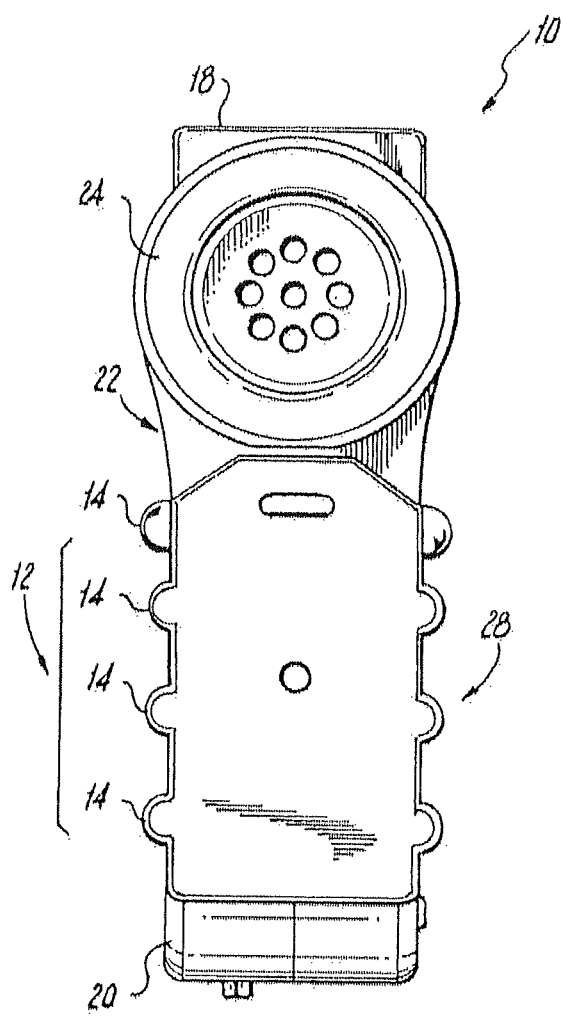
FIG. 7 is a front elevational view of the of the integrated telecommunications handset, shown in a closed position.
Figure 8:
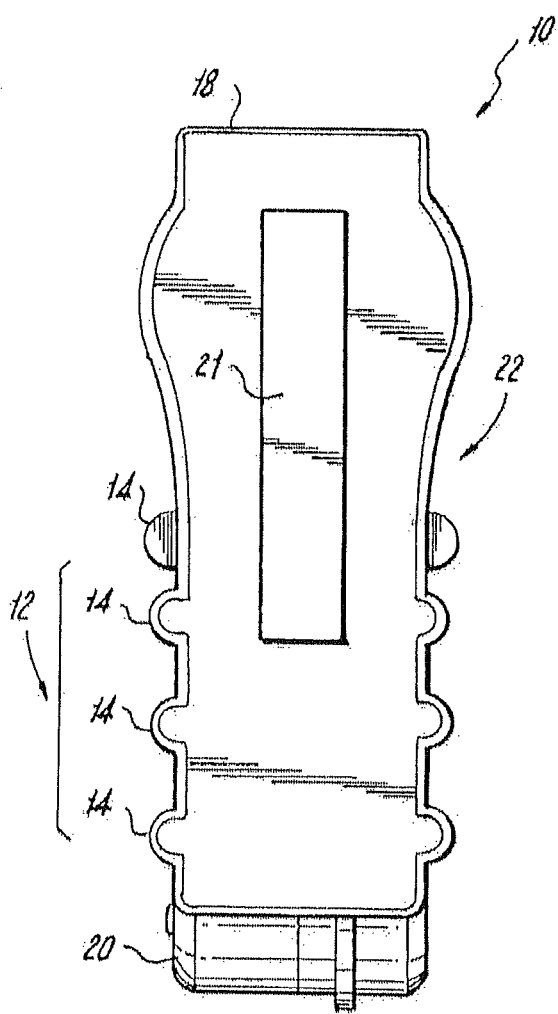
FIG. 8 is a rear elevational view of the integrated telecommunications handset.
Figure 9:
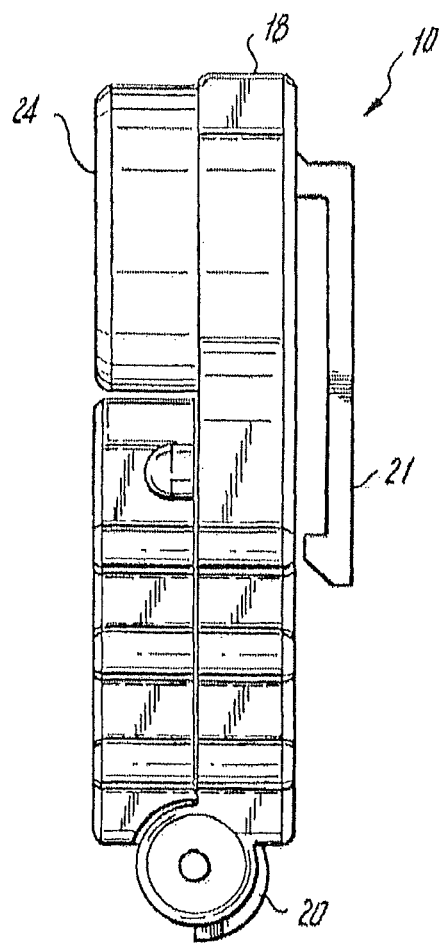
FIG. 9 is a left side elevational view of the integrated telecommunications handset.
Figure 11:
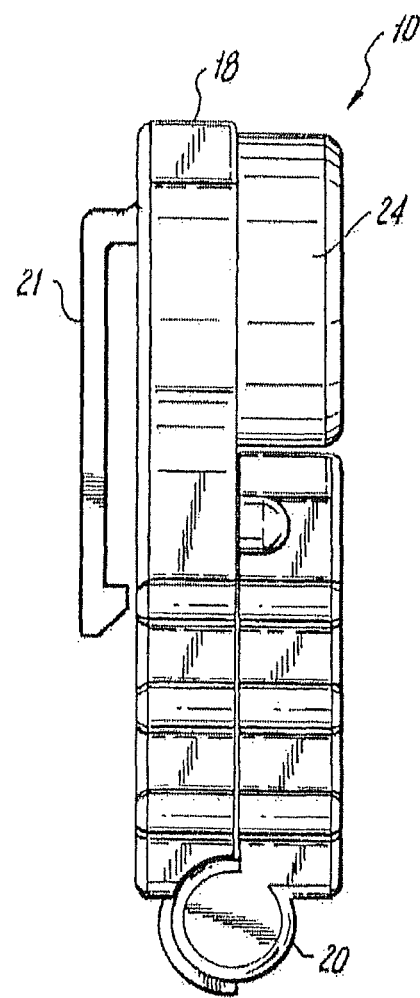
FIG. 11 is a right side elevational view of the integrated telecommunications handset.
Figure 10:
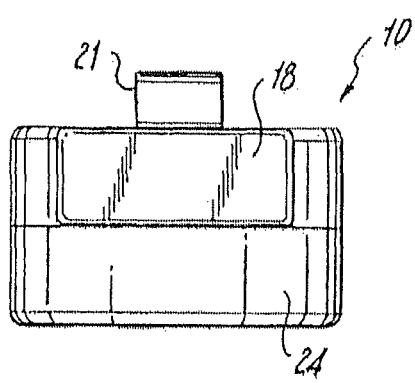
FIG. 10 is a top plan view of the integrated telecommunications handset.
Figure 12:
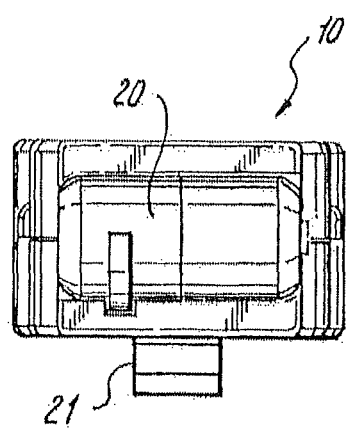
FIG. 12 is a bottom view of the integrated telecommunications handset.
Figures 13, 14:
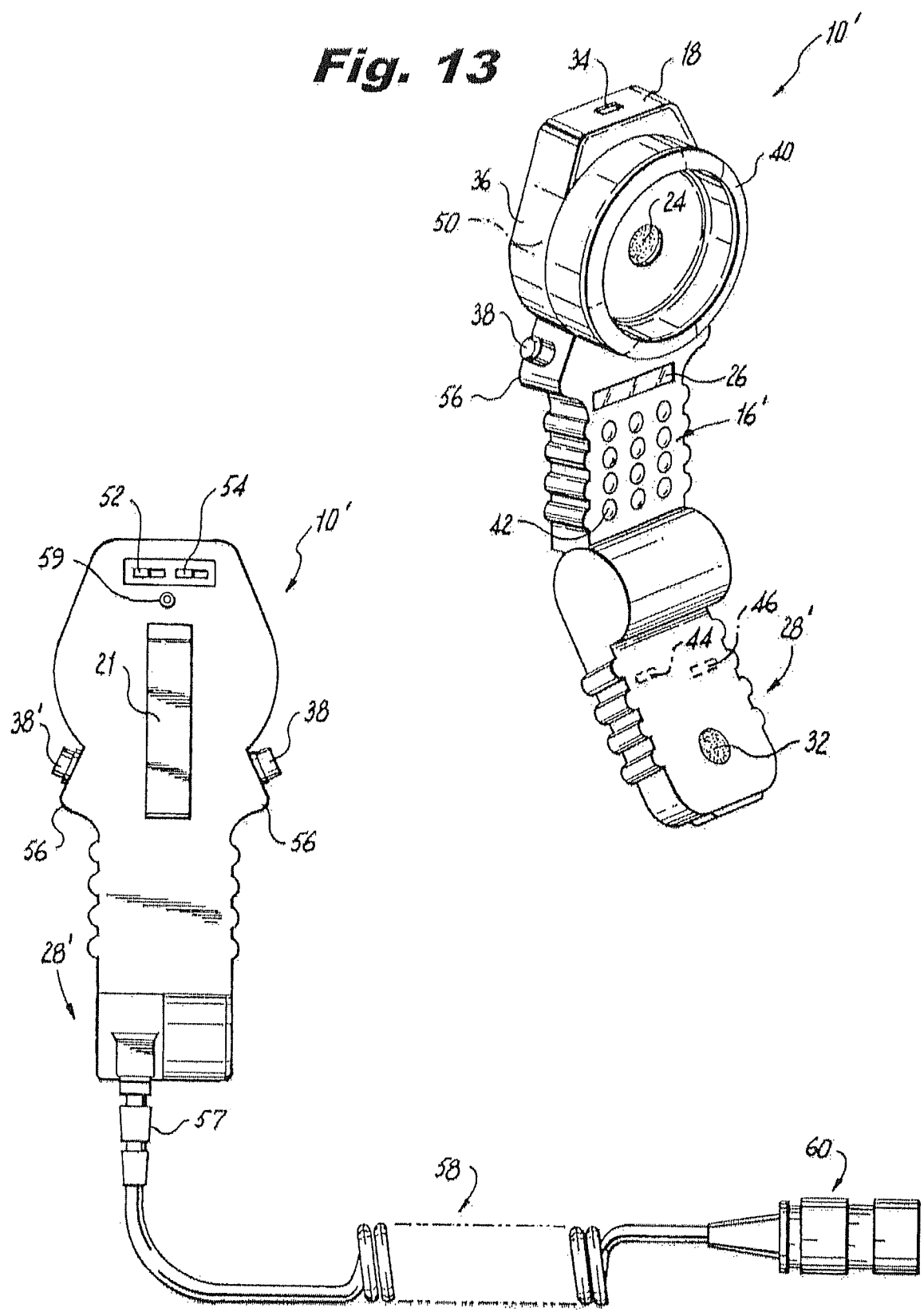
FIG. 13 is a right frontal perspective view of another embodiment of the integrated telecommunications handset, shown in an open position and highlighting many of the functional features enabled by the inventive electronics system housed therein.
FIG. 14 is a rear perspective view of the FIG. 13 embodiment highlighting user activated switches for controlling several functional features enabled by the inventive electronics system housed therein.

FIGS. 13-17 display an integrated telecommunications handset (10'), which is modification of handset (10). FIG. 13 shows a perspective view of the handset (10') in an open position. The inventive integrated telecommunications handset, e.g., handset (10'), includes various functional features that are enabled by an electronics system that is housed with the handset housing. These functional elements and their operation are now described with reference to FIGS. 13-17.

A top interface connector or port (34) is shown disposed within flat top surface (18) of the handset, which connector port functions as a data/video upload download interface for data and video transmission. The connector (34) may comprise various forms in order to facilitate the data transfer to/from the handset, e.g., USB, RS232, etc., without limitation. Also included in the handset is a built-in wireless interface (36), dual push-to-talk (PTT) switches (38), an earphone speaker (40), having dynamic or balanced armature capability, within earpiece (24) and mouthpiece microphone (32). The earphone speaker is dynamic or balanced armature, where the microphone is electret capable, to enable sound output and input, respectively. Active display screen (26) provides for communicating visual messages to the user. The active display screen is preferably a liquid crystal display, but is not limited thereto.

The integrated telecommunications handset (10') includes a standard 12-button keypad (16') is GSM-capable, IP or VoIP functional ad DTMF tone operational. Preferably, as shown, the handset (10') includes an emergency call tone generation feature (42) for situations in which speaking is not optional, for example, a battlefield operation. For that matter, the handset includes a silent mode notification (vibration) indicator (44), for receiving incoming communications. The embodiment further includes a GPS module (46) for location/position verification. Moreover, one of the dual PTT switches may be replaced with a personal locator beacon (PLB), which would operate in coordination with a GPS locator (not shown) to send out the location of the handset to rescuers where necessary. The integrated telecommunications handset (10') is preferably configured with at least 1 Gigabyte of user memory (50), but the amount may be varied for various handset applications.

FIG. 14 depicts a rear elevational view of the integrated telecommunications handset (10') in order to highlight a VOX On/Off switch (52), a 3 position gain control switch (54) and wireline feature. Integrated telecommunications handset (10') includes a connector (56) extending out of the second portion (28'). Connector 56 connects the internal electronics to a wire (58) that terminate in a second connector (60), for connection to a radio (e.g., a man-pack unit), or to multiple radios simultaneously via the multiple download option. Clip (21) is included for affixing the handset (10') to a user's clothing, a piece of equipment carried by the user, or a stationary object.

Figures 15, 16A:
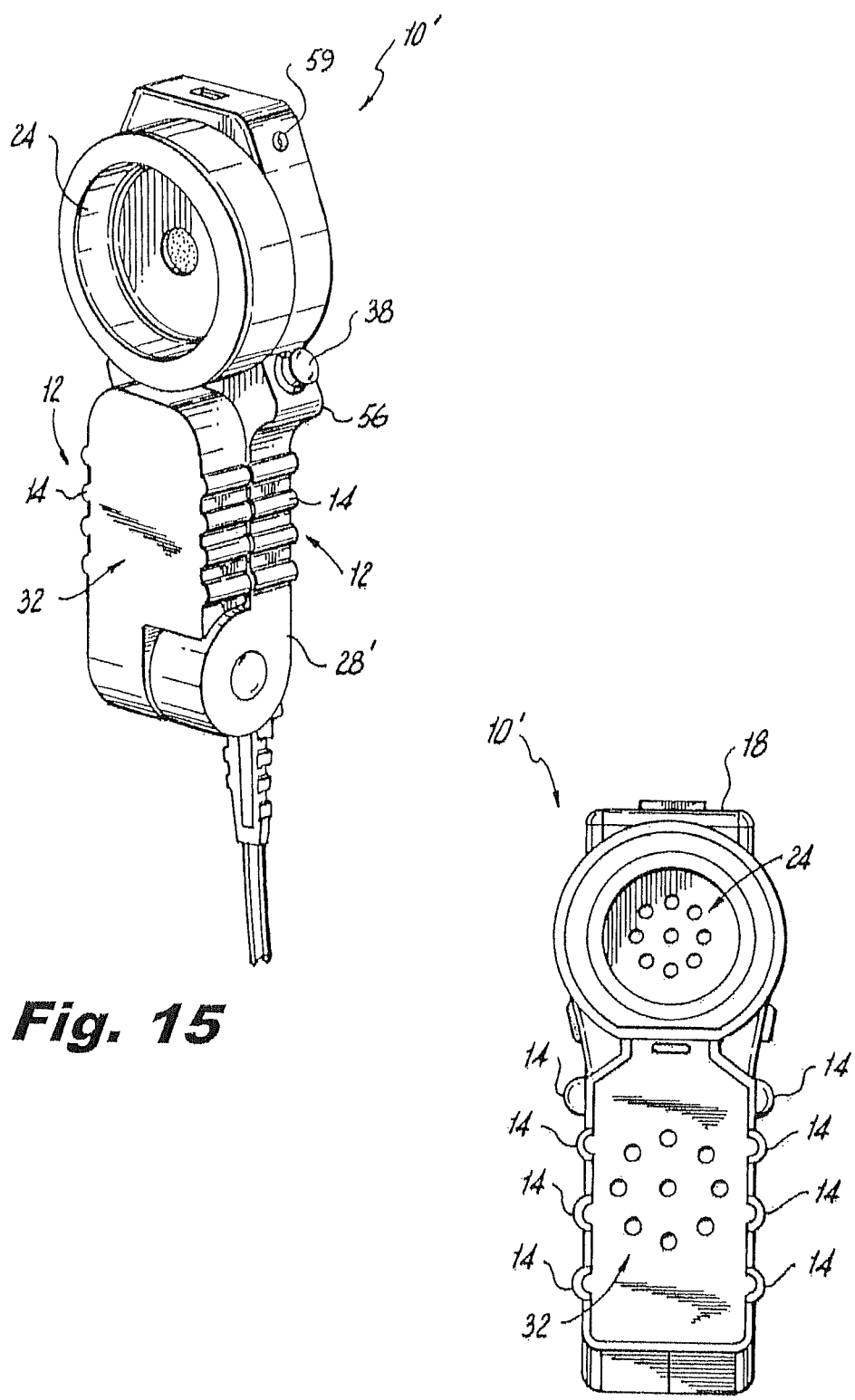
FIG. 15 is a left frontal perspective view of the of the FIG. 13 embodiment, shown in closed position and highlighting several functional features enabled by the inventive electronics system housed therein.
FIG. 16A is a front elevational view of another embodiment of the integrated telecommunications handset in a closed position.

FIG. 15 depicts a left frontal perspective view of the of the FIG. 13 integrated telecommunications handset (10'), in a closed position. The handset (10'), as shown, includes an interface port (54) for in-ear devices (not shown in FIG. 15), and highlights the ergonomic gripability of the nib arrays (14), including a nib-like extension (56) upon which the PTT switch (38) sits in cooperation with the ribs (14). The speaker microphone (32), preferably displaying electret capability, is included in the back of the handset is disposed in the front of the device when in a closed position.

FIG. 16A is a front elevational view of another embodiment of the integrated telecommunications handset (10') in a folded/closed position, highlighting speaker microphone (32), which is operational when folded/closed. As described above, the handset is small, for example, about four (4) inches when in a folded/closed position, and weighs preferably 10 ounces or less without cable. The handset is watertight for at least 30 minutes at 1 meter.

Figure 16B:
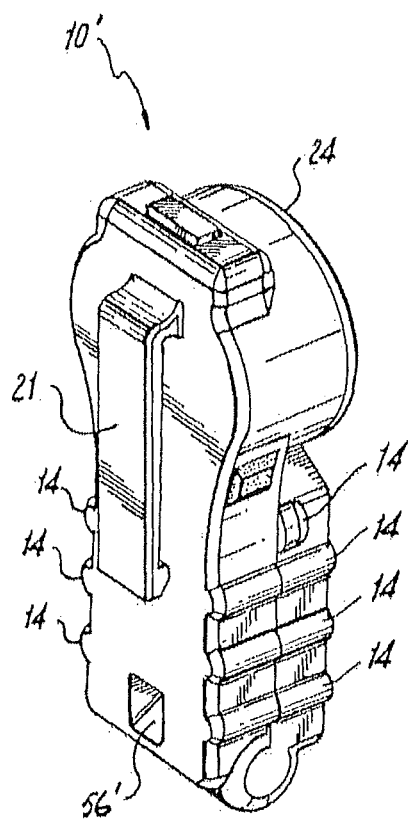
FIG. 16B is a right rear perspective view of the FIG. 16A embodiment in a closed position.

FIG. 16B shows the embodiment from a right rear perspective closed position to highlight the belt/vest clip option (21), and auxiliary I/O port and termination the specification of which is optional to coordinate with particular use/radio applications.

Figure 17A:
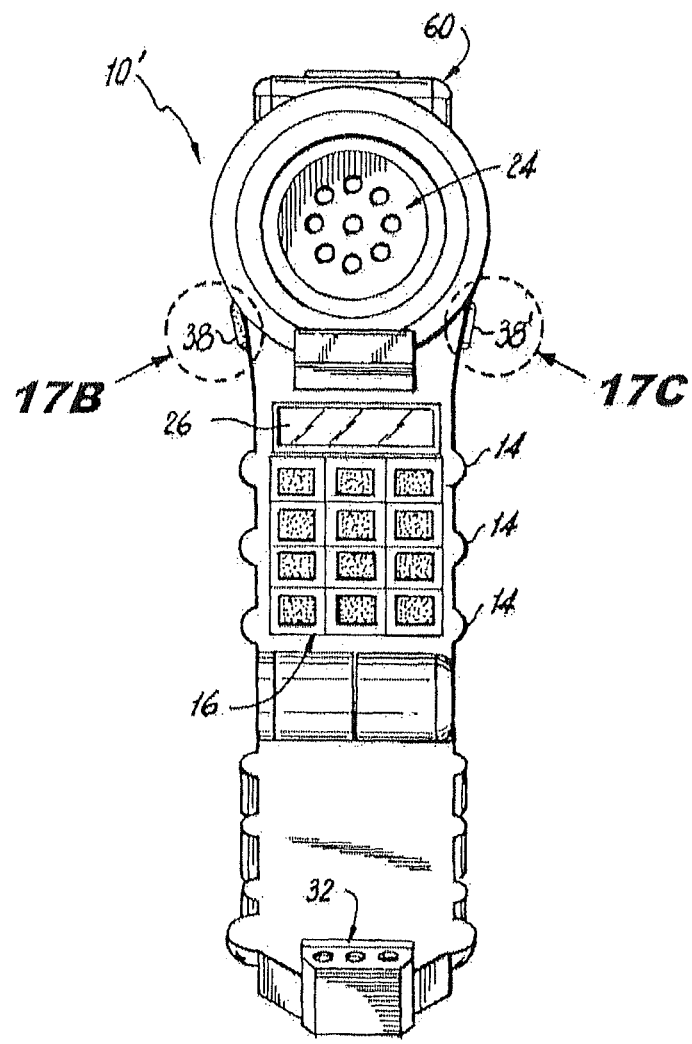
FIG. 17A is a front elevational view of another embodiment of the integrated telecommunications handset in an open position.
Figure 17B:
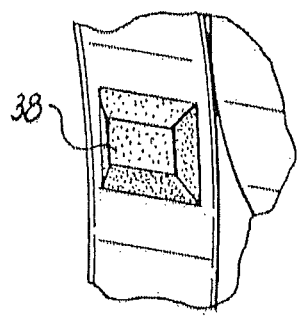
FIG. 17B is an enlarged view of a recessed membrane PTT (push to talk switch) depicted in the FIG. 17A embodiment.
Figure 17C:
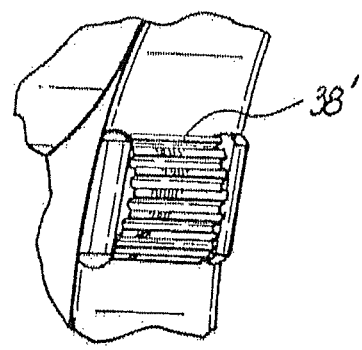
FIG. 17C is an enlarged view of a recessed and guarded on-off volume switch for an external speaker microphone in the FIG. 17A embodiment.

FIG. 17A is a front elevational view of another embodiment of the integrated telecommunications handset (10') in an open position. The FIG. 17A embodiment highlights the optional wireless capability (60), optional keypad and character display (16), recessed membrane push-to-talk (PTT; 38), recessed and guarded on-off volume switch for an external speaker microphone, and speaker microphone (38'). The recessed membrane PTT (38) and guarded on-off volume switch (38') are shown enlarged in FIGS. 17B and 17C, respectively. As such, the embodiment provides the option of having the push-to-talk (PTT) button on one side and the volume control button on the other side being recessed within the little protective walls, sort of like a crater. The FIG. 17D is a left frontal perspective view of the FIG. 17A handset (10'), highlighting its open, ergonomically-correct position/operation.

Figure 17D:
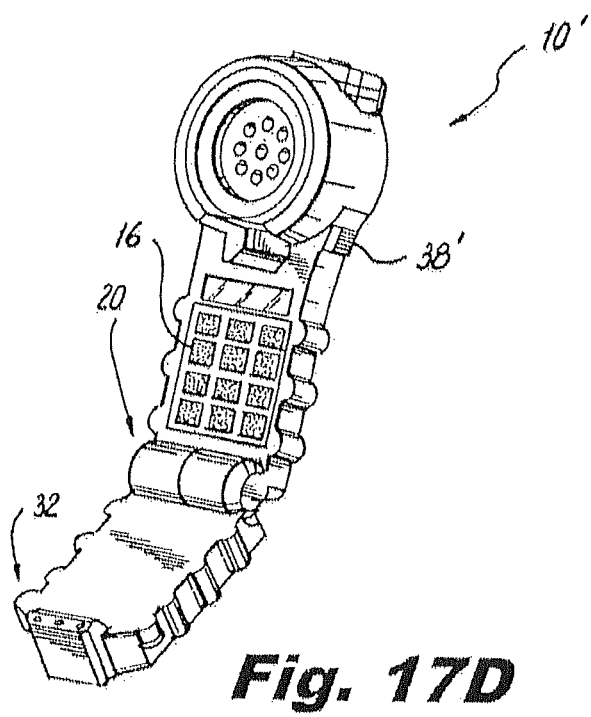
FIG. 17D is a left frontal perspective view of the FIG. 17A embodiment open in an ergonomically-correct position.

FIG. 17D highlights the arrays of protruding nibs (or ribs), included both to enable the user to operate while wearing gloves but also for a more tactile grip (smooth surface might slip, especially when wet). For that matter, the rib arrays on the upper keyboard and earpiece potion above the hinge are in positional register and match the corresponding arrays of protruding nibs on the lower mouthpiece portion below the hinge when the handset is in the closed position. This enables the handset with the earpiece exposed for PTT function to operate like a walkie talkie or, for example, a Nextel phone. A personal locator beacon PLB operates with the GPS feature to send out a location signal to rescuers.

FIGS. 18A, 18B and 18C are front, side and front perspective views of an alternative embodiment of the integrated telecommunications handset (10") that is configured in a single rigid piece construction, for ready and secure mounting upon head gear, e.g., a helmet, worn by a handset user. The FIG. 18A view highlights the handset ability to connect to an earpiece (24). Earpiece (24) includes a wire (25) and connector (27), which connector (27) plugs into and mates with connect/port (54). Handset (10") is rigid, as distinguished from handsets (10; 10'), which are foldable. That is, mouthpiece portion (28') is not foldable. While handle (10") is rigid, and therefore larger in length than handsets (10; 10') when in their folded/closed positions, the rigid fixed length is beneficial in its ability to be reliably affixed to a helmet arranged to receive it (helmet not shown).

The FIG. 18B view highlights one definition of an angle at which mouthpiece portion (28') extends from an axial center of the main housing of handset (10"). FIG. 18C is a perspective view of a wireline embodiment of handset (10"), including wire (58), which handset (10") may also be configured for wireless operation.

FIG. 19 is a block diagram depicting one embodiment of an integrated electronics system (100), which may be included in the integrated telecommunications handsets of the invention. The integrated electronics system (100) enables the handset to connect to multiple radios simultaneously; to function with voice activation capability; to function as a speaker microphone; to function as a data/video upload download interface to radio for transmission to the network; to operate a standard 12-button keypad and operate an active display, i.e., accepting touch user inputs in some models. The optional electronics provides wireless radio interface, and wireless telecommunications ability (GSM capable). Preferably, the radio option includes a URC capability, operating with a Zigbee or other platform format. For that matter, the electronics enable the handset to automatically match radio input impedances, and receive multiple download configurations. The handset electronics will operate with an interface port for in-ear devices, DTMF tone generation, silent mode notification (vibration), automatic gain control, IP based functionality.

The physical speaker capability is dynamic or balanced armature. The ergonomic design enables use with gloved hands. For that matter, the handsets weigh less than 1 lb. with cable, as wholly user (field) configurable, disposable and may be produced in any color options in durable polycarbonate. For that matter, the handsets are Mil-STD-810 tested and certified; EMI/EMP hardened, and can by GPS enabled for location/position verification. Preferably, each includes up to 1 gigabyte embedded user memory, and operates with a small electronic signal footprint to facilitate squad level communications when used for military purposes. A versatile phase-locked loop in the optional electronics allows the device to operate at various frequencies, up to and exceeding GSM. The handset is waterproof to 3 meters (for a limited time) and includes emergency call tone generation for situation where talking is not an option. For that matter, the handset can be TEMPEST certified with radio systems.

The heart of the electronic operation is the programmable microcontroller (110). The invention, however, is not limited to a programmable microcontroller per se, but may be controlled by discrete electronics and/or a microprocessor. When controlled by a microprocessor, the microprocessor is operated in accordance with a set of computer readable instructions (e.g., a software application) instructions that operates/implements each of the following features in cooperation hardware elements.

That is, the microprocessor or programmable microcontroller (110) control(s) responses to a number of various inputs functions (111). Input functions (111) include voice activation (VOX) hardware (112), receives and processes data from serial (I/O) port (114), Optional keypad function (116), and push-to-talk (PTT) function (118). The optional keypad function cooperates with DTMF encoder/decoder and A/D conversion function (120), which cooperates with GPS functionality (122). The push-to-talk (PTT) function cooperates with microphone (124), filters and AGC (128). In the case of a microprocessor, the microprocessor operates by a set of computer readable instructions comprising a handset operational application program. In a case of an embedded control system or a memory programmable controller (discussed below in more detail), the functional element hardware is directly connected to the embedded control system or memory programmable controller in order that it may respond without delay normally associated with a microprocessor driven application programs.

Cellular electronics (132) cooperates with programmable microcontroller (110), keypad (116) and DTMF function (120), driving vibration function (134) as part of the integrated electronics system (100). As indicated in FIG. 19, various drivers may be included to implement the actual microcontroller control. LCD display (136) is shown to be controlled (driven) via microcontroller (110), which presents display images comprising GPS, channel positioning, audio elements such as volume level and text messages/messaging control modes (represented by block (138)). Encryption function (140) provides for the encryption of video, voice and other data exchanged between the microcontroller (110) and a wireless interface (142) and an impedance matching/voltage biasing function/device, for handset wireline functioning.

A user audio function (146) outputs audio to received audio channels, including streaming audio. The audio data is provided to/from transceiver (152). The audio may be sampled and provided to a listening device by in-ear function (150). All functions, while described for operation in one direction, are operation in both directions. The hardware elements that may comprise/cooperate with the identified functions discrete or monolithic. Preferably, the system is integrated on a single board, or a single ASIC.

According to the invention, many of the functions controlled by the integrated electronics system are time critical, in view of the fact that every second counts for users of the handset under combat conditions. In view of same, the programmable microcontroller 110 is preferably an embedded control system or a memory programmable controller, known for use in providing and controlling time-critical functions. A memory programmable controller is an electronic controller utilized to implement very specific and time critical operations. The memory programmable controller has input and output interfaces directly connected to the hardware elements and components above-described, and shown in FIG. 19. The controller is programmed specifically to control the input data of the time-critical functions.

Alternatively, the programmable microcontroller 110 may be an embedded computer system that is driven by firmware include in a ROM (read- only memory) located as part or connected directly to programmable controller 110, e.g., a flash ROM. Such an embedded controller system will also have RAM (random access memory), e.g., as static RAM. In comparison to conventional computer systems found in conventional handsets, embedded systems more quickly and efficiently process time-critical applications.

Figure 20:
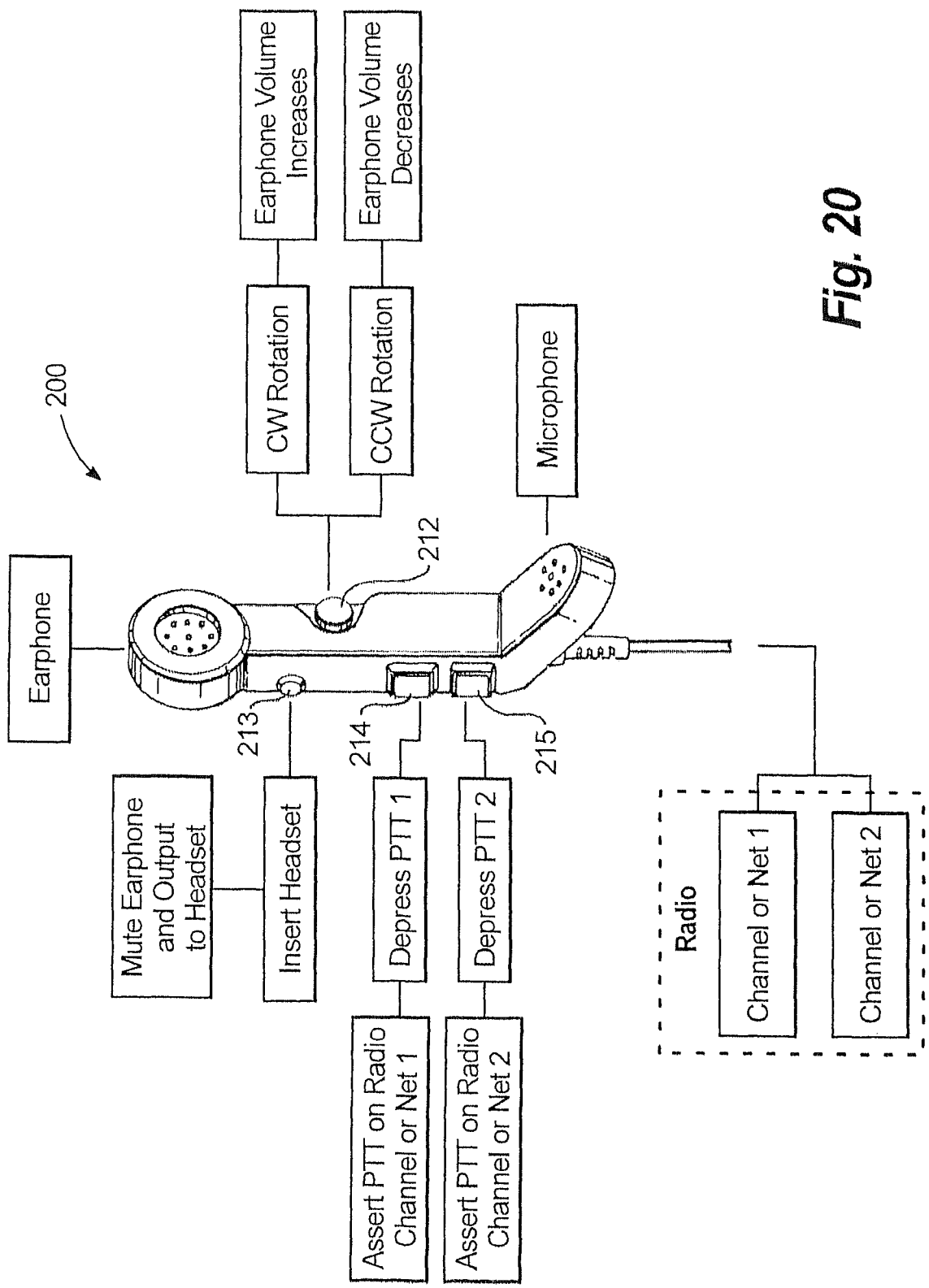
FIG. 20 is a perspective view of a fully featured radio handset of this invention with some functional information about the features and controls.

As can be seen in FIGS. 20-26A, an embodiment of a radio handset 200 of the invention is shown in block diagram FIG. 20 with microphone 210, earphone 211, volume control wheel 212, headset jack 213, PTT 1 button 214, PTT 2 button 215 and connection cable 216. Pushing PTT 1 button 214 asserts a Push to Talk function on a radio channel or first net channel. Pushing PTT 2 button 215 asserts a Push to Talk function on a second radio channel or second net channel. Therefore connection cable 216 can be connected to a dual channel/net radio.

Preferably, clockwise rotation of the volume control wheel 212 increases earphone volume, and counterclockwise rotation of the volume control wheel 212 decreases earphone volume. In this embodiment, the user has the option asserting PTT on a first net, a second net or both together at the same time. Radio handset 200 transmits and receives intelligible, distortion-free voice signals, without interference. Ear impedance is preferably 1000 ohms and microphone impedance is preferably 150 ohms in the embodiment shown. The handset 200 meets or exceeds military performance specification MIL-PRF-49078 (H-250 style wiring). High actuation force limits accidental keying in the field.

Figure 21:
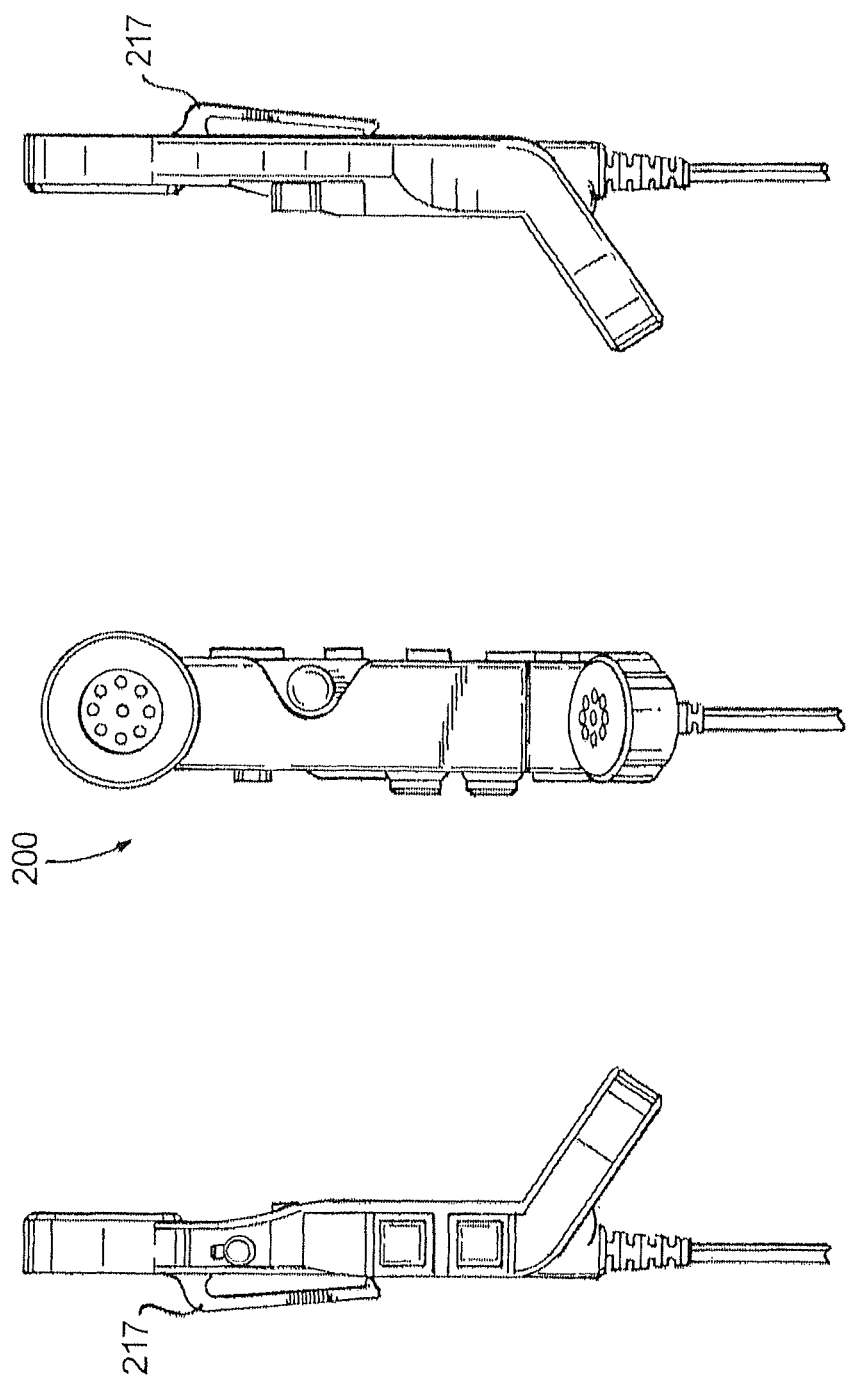
FIG. 21 is a dimensioned front as well as right and left side elevations of the radio handset of FIG. 20.
Figure 22:
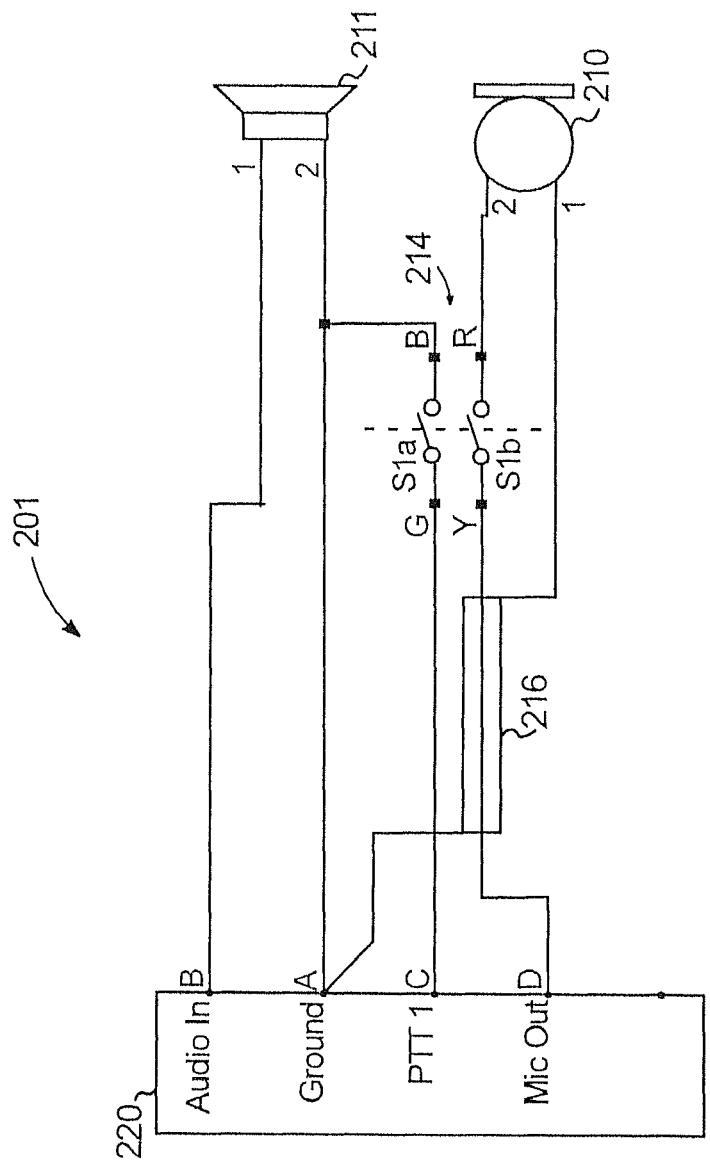
FIG. 22 is an internal schematic of a radio handset configured as an H-250 single channel replacement.

The dimensions of handset 200 are shown in FIG. 21. Note the thin dimension (0.69") of earphone 211 in the right elevation; this enables convenient communications with a helmet on. Also shown is helmet clip 217 attached to the housing of handset 200; this is conveniently handled with one gloved hand. Helmet clip 217 can attach to uniform clothing pockets, to a belt or to equipment. Other ergonomic elements relate to the edge mounted volume control 212 and generous color-coded PTT momentary push buttons 214 and 215; these features can also be operated with gloves on.

Various species of radio handset 200 are formed to serve particular markets, as shown in FIGS. 22, 22A, 23, 23A, 24, 24A, 25, 25A, 25B, 26 and 26A.

Handset 201 (see schematic diagrams of FIG. 22 and FIG. 22A) is backwards compatible with the H-250 handset for a single channel radio. Note that low noise microphone cable 216 with tinsel wire shield and conductor, and super flexible vulcanized rubber insulation is used in all variations. Handset 201 has a single radio connector 220 and one PTT switch 214. Depressing the PTT button 214 activates microphone 211 and asserts the PTT function on the radio through single radio connector 220. Handset 201 transmits and receives intelligible, distortion-free voice signals.

Figure 23:
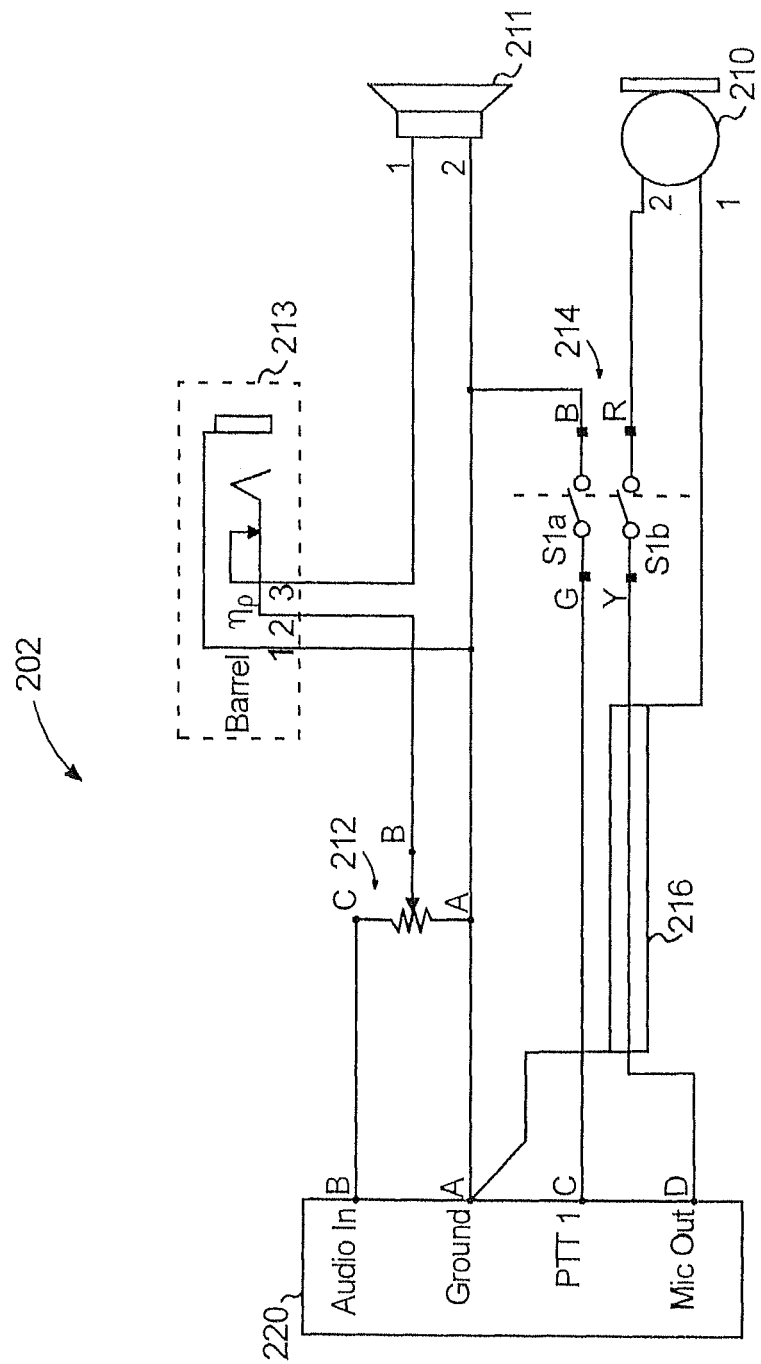
FIG. 23 is an internal schematic of a fully featured single PTT radio handset.
Figure 23A:
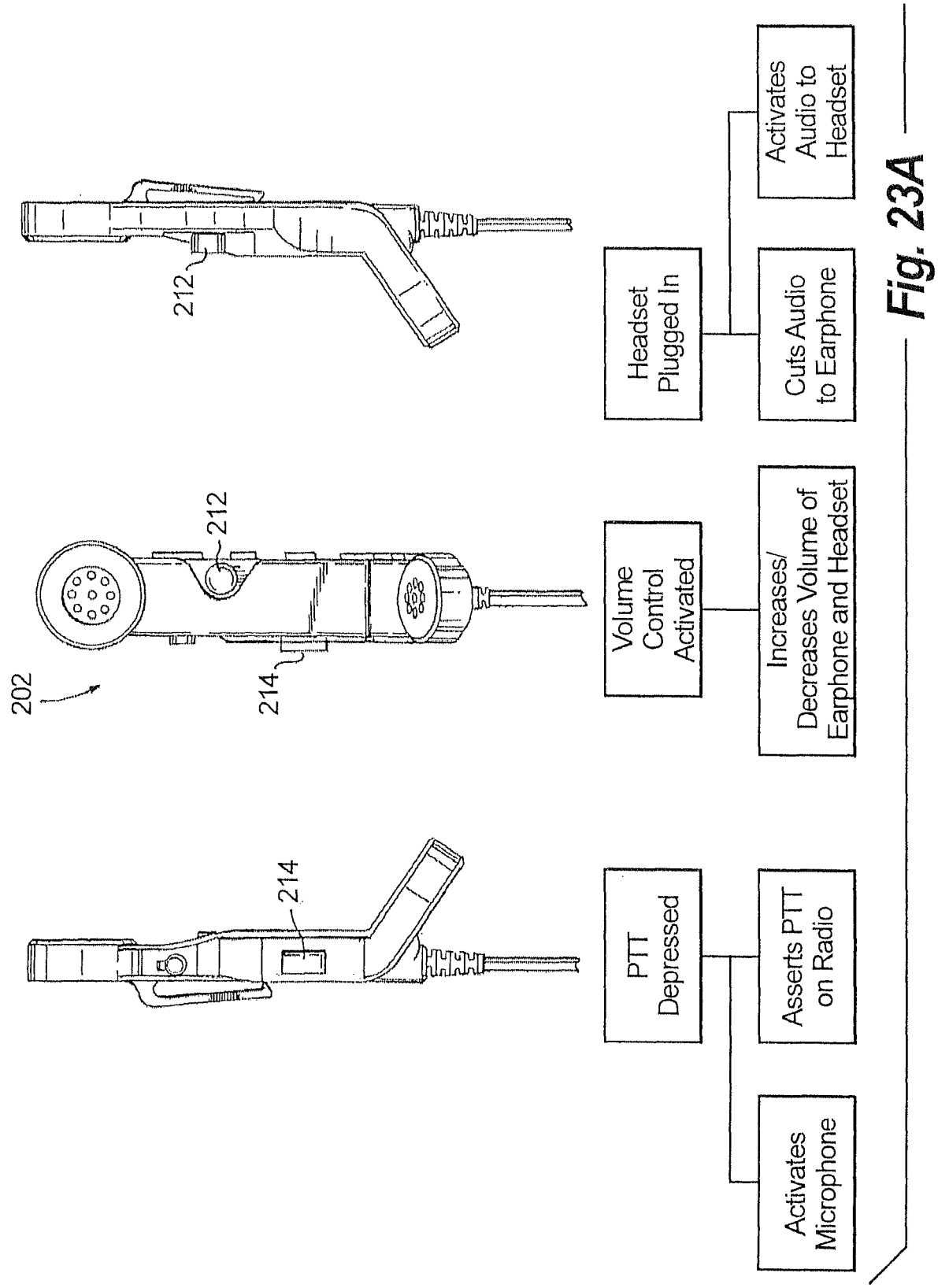
FIG. 23A is a front and two side elevations of the radio handset of FIG. 23 with functional flow chart.

FIGS. 23 and 23A show a fully featured single radio (or channel) handset 202 with a single PTT button 214, connector 220, volume control 212, and headset jack 213. Handset 202 has a sensitivity of −56 dBm MIN at 1000 Hz and 28 dynes per square centimeter. Distortion is less than 5% between 100 Hz and 3500 Hz. A 3.5 mm headphone jack 213 with a built-in switch is provided, and the earphone mutes when the headset is inserted. Thumbwheel 212 controls volume. Handset 202 transmits and receives intelligible, distortion-free voice signals.

Figure 24:
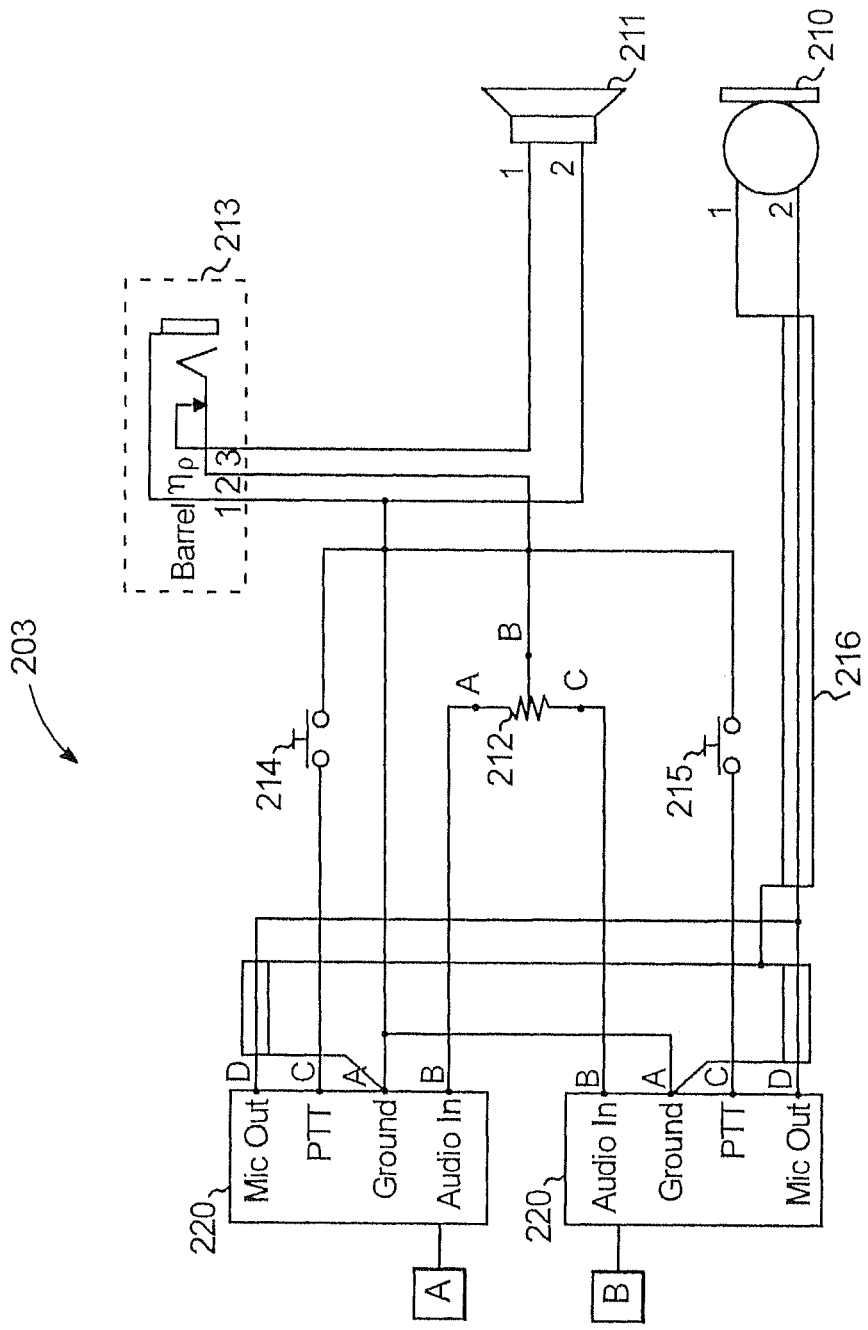
FIG. 24 is an internal schematic of a Y-Branch radio handset.
Figure 24A:
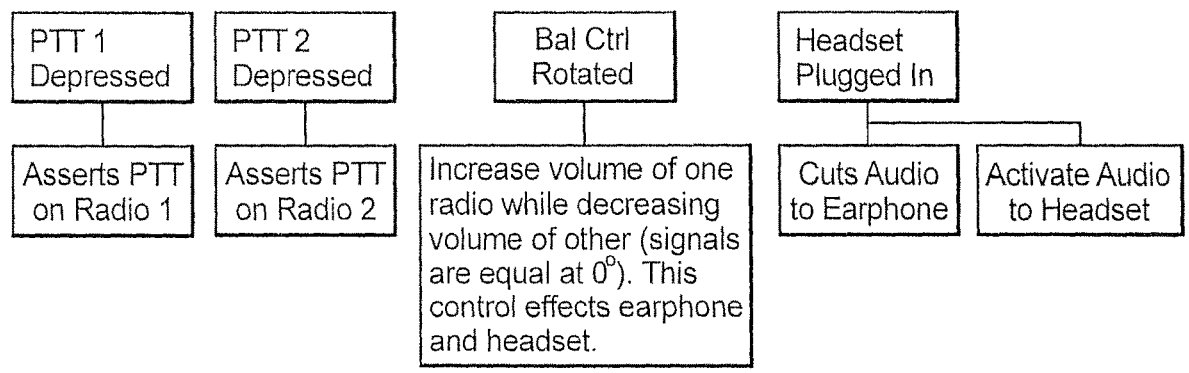
FIG. 24A is a functional flow chart of the radio handset of FIG. 24.

FIGS. 24 and 24A show a Y-Branch Radio handset 203 with a Y-branch connector having two branch connectors 220 to connect to two separate radios, two momentary PTT buttons 214 and 215 (each preferably connected to respective separate radios A and B), a volume control 212, and headset jack 213. Handset 203 operates with two radios, with a two channel radio or with a single channel radio. It should be noted that rotating thumbwheel volume control 212 increases the volume of radio A while simultaneously decreasing the volume of radio B. Rotation in an opposite direction does the opposite. Optionally, both radios A and B can be heard equally. For example, when the thumbwheel volume control rotation is a 0 degrees, radio signals from radios A and B are equal. Each radio A and B utilizes respective U-329 style 6-pin connectors. A listen-only headset connector can be connected, which can either cut the audio to an earphone or activate audio to an earphone. Handset 203 transmits and receives intelligible, distortion-free voice signals.

Figure 25:
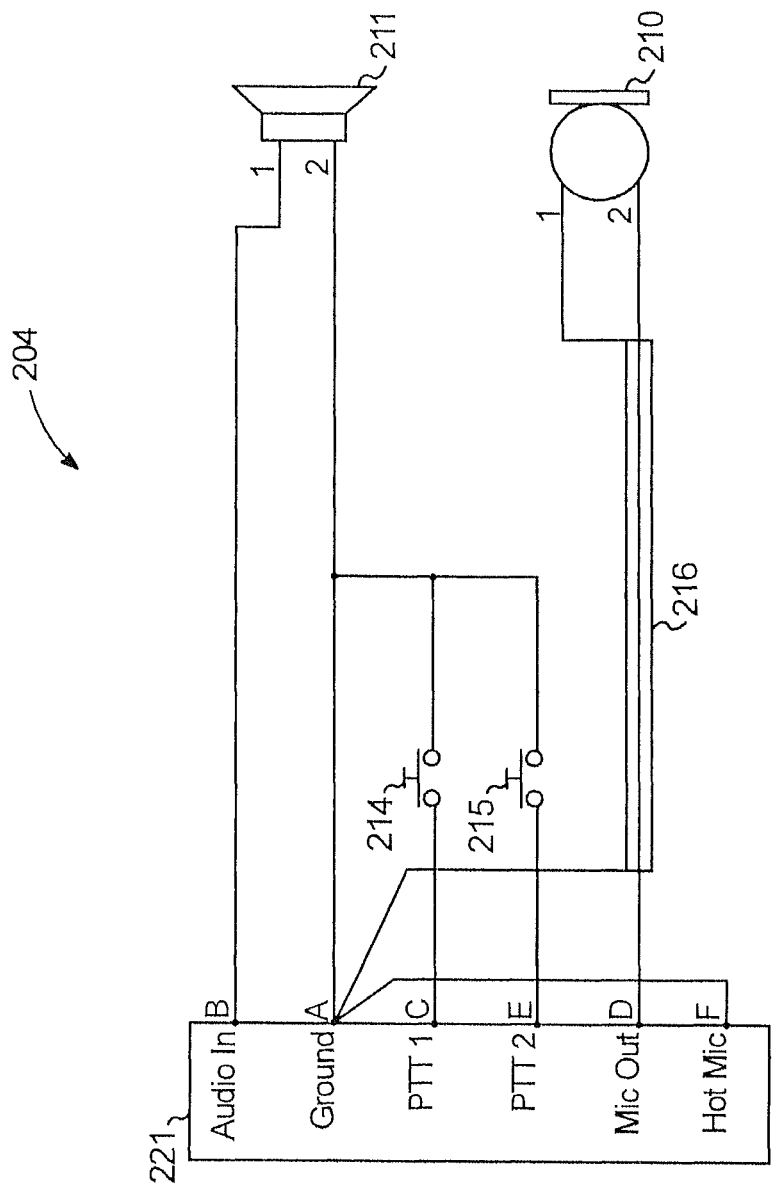
FIG. 25 is an internal schematic of a field phone handset.
Figure 25B:
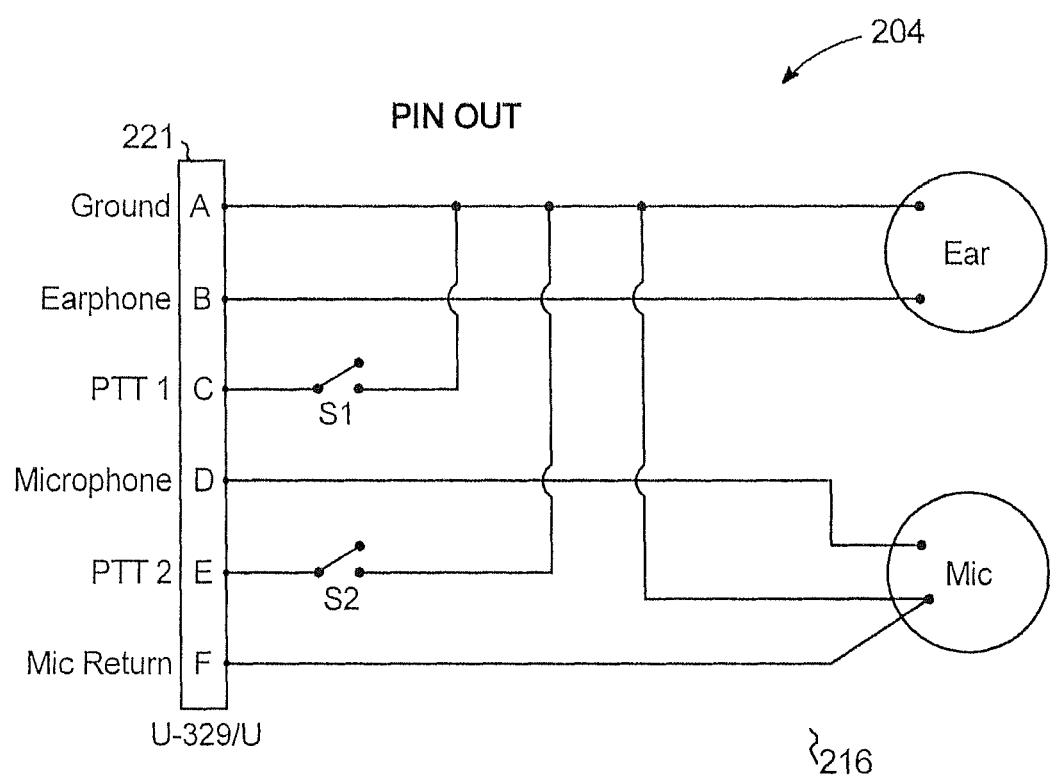
FIG. 25B is a Pin Out schematic diagram of the connector of FIGS. 25 and 25A.

FIGS. 25, 25A and 25B show a minimally configured dual net handset 204 with a single dual net connector 221 and two PTT buttons 214 and 215. The two PTT buttons operate similar to the two PTT buttons 214 and 215 of FIGS. 24 and 24A. A hot microphone can be always active with handset 204 for use with field phones. The handset 204 meets or exceeds military performance specification MIL-PRF-49078A (H-350 style wiring), as compared to headsets 200, 201, 202 and 203, which meet or exceed military performance specification MIL-PRF-49078 (H-250 style wiring). Connector 216 is a U-329/u 6 pin connector. Handset 204 transmits and receives intelligible, distortion-free voice signals.

Figure 26:
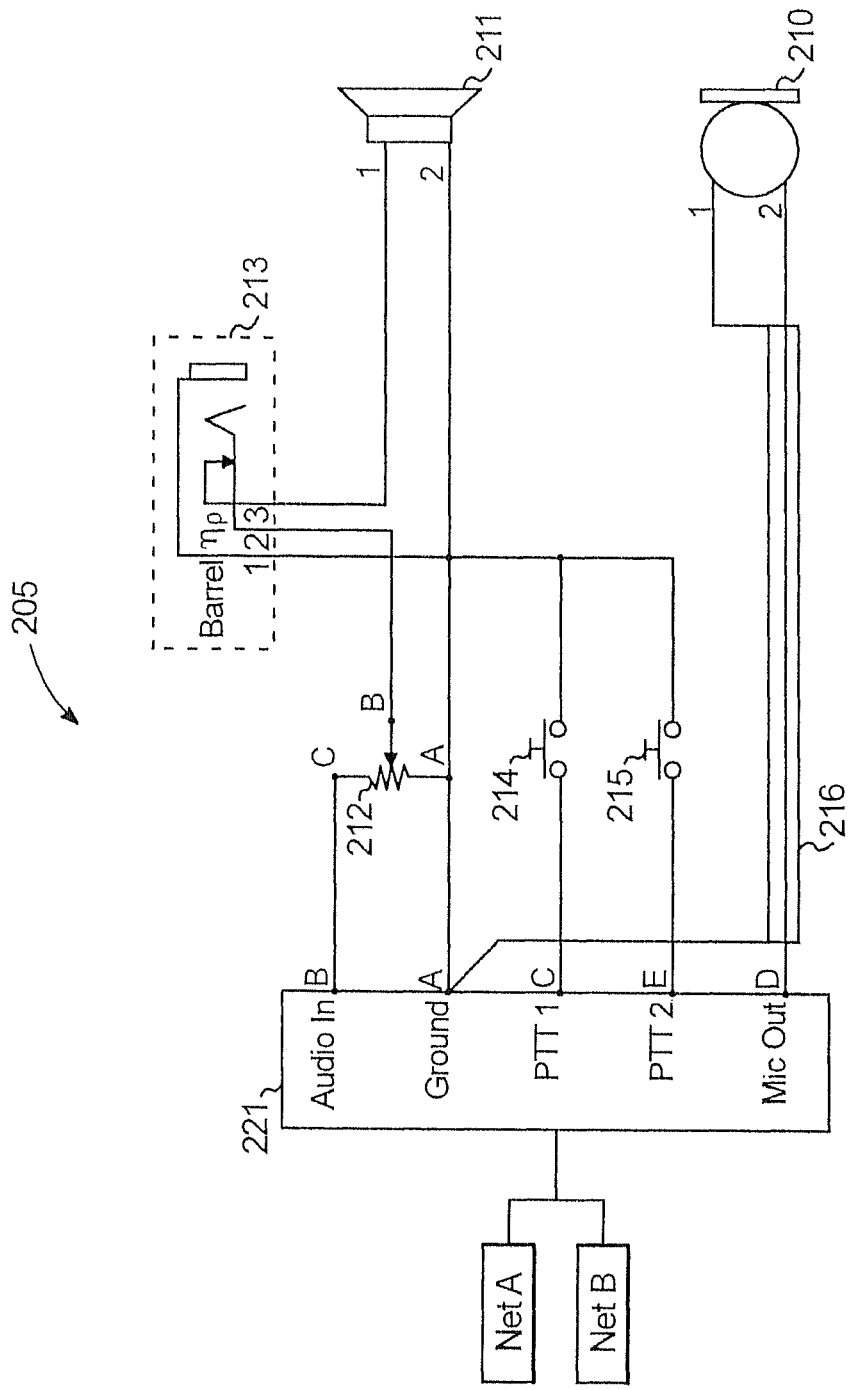
FIG. 26 is an internal schematic of a fully featured dual net radio handset.

FIGS. 26 and 26A show a fully configured dual net handset 205 with single dual net connector 221, volume control 212, headset jack 213, and momentary PTT buttons 214 and 215, each connectable to a respective Net A or Net B of a dual net radio. Handset 205 is different from handset 203 in FIGS. 24 and 24A showing handset 203 with a Y-branch connector for connecting to two separate radios A and B. The handset 205 meets or exceeds military performance specification MIL-PRF-49078 (H-250 style wiring). Connector is a U-329 style 6 -pin connector. Handset 205 transmits and receives intelligible, distortion-free voice signals.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention. For that matter, modifications may be made to the present invention as described without departing the scope of the invention.

We claim:

1. An integrated telecommunications handset comprising:
an integrated electronic system in said handset enabling the handset to connect to multiple radios simultaneously in said handset, said integrated electronic system comprising a microphone, earphone, a volume control wheel, headset jack, first and second push to talk (PTT) buttons, said first PTT button for connection to a first radio, and said second PTT button for connection to a second radio, said first and second PTT buttons being located on one side of said handset adjacent to and spaced from each other to allow conversation on both radios simultaneously when both PTT buttons are pressed, and a single dual net connector for providing said connections;

said microphone being directly connected to both said first and second PTT buttons through said connector;

said volume control wheel connected to said earphone such that clockwise rotation of said volume control wheel increasing earphone volume, and counterclockwise rotation of said volume control wheel decreasing earphone volume; wherein said volume control, when rotated in one direction increases the volume in one radio and decreases volume in an adjacent radio, and vice versa;

said handset having an option for a user to assert a PTT button on the first radio, the second radio or both together;

wherein depression of each respective first and second PIT buttons respectively activates a respective microphone and asserts the PTT function on each said first radio and said second radio;

a headphone jack with a built-in switch;

wherein the earphone is muted when the headset is inserted into said headphone jack;

wherein said thumbwheel volume control is connected to both said first and second radios whereby rotation in one direction increases volume for one radio and reduces volume for the other radio, with reverse rotation of the thumbwheel having opposite effects, said thumbwheel having a zero position where radio signals from both radios are equal, said thumbwheel volume control being located in a recessed portion of said handset adjacent a side of said handset opposite from said first and second PTT buttons;

said handset transmitting and receiving intelligible, distortion-free voice signals to and from either said first radio, said second radio, or both thereby allowing the user to have direct access to, and converse on both radios simultaneously;

said integrated electronic system including a programmable microcontroller for enabling said handset to connect to multiple radios simultaneously and control responses to a number of inputs functions including receiving and processing data from a serial port; and an LCD display driven by said microcontroller for presenting display images comprising GPS, channel positioning, audio elements such as volume level and text messaging.

2. The handset of claim 1 in which said handset meets or exceeds military performance specification MIL-PRF-49078 with H-250 style wiring.

3. The handset of claim 1, having a listen-only headset connector for either cutting the audio to an earphone or activating audio to an earphone.

4. The handset of claim 1, wherein said connectors between the handset and the two separate radios comprise a Y-branch connector.

* * * * *